United States Patent
Hazani

(10) Patent No.: US 11,855,455 B2
(45) Date of Patent: Dec. 26, 2023

(54) SYSTEMS AND METHODS FOR POWER START UP IN A MULTI-UNIT POWER DISTRIBUTION NETWORK

(71) Applicant: Corning Research & Development Corporation, Corning, NY (US)

(72) Inventor: Ami Hazani, Raanana (IL)

(73) Assignee: Corning Research & Development Corporation, Corning, NY (US)

( * ) Notice: Subject to any disclaimer, the term of this patent is extended or adjusted under 35 U.S.C. 154(b) by 127 days.

(21) Appl. No.: 17/238,028

(22) Filed: Apr. 22, 2021

(65) Prior Publication Data

US 2021/0333858 A1  Oct. 28, 2021

Related U.S. Application Data

(60) Provisional application No. 63/014,408, filed on Apr. 23, 2020.

(51) Int. Cl.
*H02J 1/06* (2006.01)
*H02H 7/26* (2006.01)
*G06F 1/26* (2006.01)

(52) U.S. Cl.
CPC ............ *H02J 1/06* (2013.01); *H02H 7/268* (2013.01); *G06F 1/26* (2013.01)

(58) Field of Classification Search
CPC ..... H02J 1/001; H02J 1/06; H02J 3/36; G06F 1/26; G06F 1/28; H05B 47/20–29;
(Continued)

(56) References Cited

U.S. PATENT DOCUMENTS 5,159,543 A * 10/1992 Yamawaki ............. H02M 3/07
363/60
5,774,316 A   6/1998 McGary et al.
(Continued)

FOREIGN PATENT DOCUMENTS

EP        1347607 A1    9/2003
WO   2004/093283 A1   10/2004
(Continued)

OTHER PUBLICATIONS

"Astable Multivibrator", Jun. 9, 2017, Electronics Tutorials, retrieved via Wayback machine at <https://web.archive.org/web/20170609043530/https://www.electronics-tutorials.ws/waveforms/astable.html> (Year: 2017).*

*Primary Examiner* — Rexford N Barnie
*Assistant Examiner* — David A Shiao
(74) *Attorney, Agent, or Firm* — William D. Doyle

(57) ABSTRACT

Systems and methods for power start up in a multi-unit power distribution network contemplate selectively disconnecting and reconnecting a remote subunit from a power conductor in a power distribution network at a relatively low frequency while providing short current pulses (at a low duty cycle) with enough energy transfer to power conditioning elements within the remote subunit during a start-up sequence. Once the power conditioning elements are properly charged, the remote subunit may change frequencies of the disconnecting and reconnecting so as to synchronize such disconnections to an expected frequency at the power source. Circuitry at the power source may measure activity on the power conductors regardless of frequency to detect an unwanted load on the power conductors (e.g., a human contacting the power conductors).

20 Claims, 14 Drawing Sheets

(58) Field of Classification Search
CPC ....... H02H 7/226–228; H02H 7/26–30; H02H 1/0007–003; G01R 31/08–11; G01R 31/58; G01R 19/165–175; H04B 10/25; H04L 12/10

See application file for complete search history.

(56) References Cited

U.S. PATENT DOCUMENTS

| | | | |
|---|---|---|---|
| 6,584,197 | B1 | 6/2003 | Boudreaux et al. |
| 7,545,055 | B2 | 6/2009 | Barrass |
| 8,559,150 | B2 | 10/2013 | Veroni |
| 8,605,394 | B2 | 12/2013 | Crookham et al. |
| 8,781,637 | B2 | 7/2014 | Eaves |
| 9,042,732 | B2 | 5/2015 | Cune et al. |
| 9,240,835 | B2 | 1/2016 | Berlin et al. |
| 9,325,429 | B2 | 4/2016 | Berlin et al. |
| 9,497,706 | B2 | 11/2016 | Atias et al. |
| 9,532,329 | B2 | 12/2016 | Sauer |
| 9,673,904 | B2 | 6/2017 | Palanisamy et al. |
| 9,685,782 | B2 | 6/2017 | Blackwell et al. |
| 9,865,782 | B2 | 1/2018 | Chiu et al. |
| 10,020,885 | B2 | 7/2018 | Mizrahi et al. |
| 10,257,056 | B2 | 4/2019 | Hazani et al. |
| 10,404,099 | B1 | 9/2019 | Bonja et al. |
| 10,405,356 | B2 | 9/2019 | Hazani et al. |
| 10,658,837 | B2 | 5/2020 | Hazani |
| 2003/0178979 | A1 | 9/2003 | Cohen |
| 2006/0152200 | A1* | 7/2006 | Kanai ........................ H02J 7/35 323/222 |
| 2006/0232134 | A1 | 10/2006 | Kirkorian |
| 2011/0007443 | A1 | 1/2011 | Crookham et al. |
| 2013/0033106 | A1 | 2/2013 | Schindler et al. |
| 2014/0243033 | A1 | 8/2014 | Wala et al. |
| 2014/0308044 | A1 | 10/2014 | Heidler et al. |
| 2015/0077130 | A1 | 3/2015 | Hackl |
| 2015/0207318 | A1 | 7/2015 | Lowe et al. |
| 2015/0215001 | A1 | 7/2015 | Eaves |
| 2015/0249335 | A1* | 9/2015 | Waheed .................... H02J 1/08 307/33 |
| 2015/0350756 | A1 | 12/2015 | Cune et al. |
| 2016/0282894 | A1 | 9/2016 | Hazani et al. |
| 2016/0352393 | A1 | 12/2016 | Berlin et al. |
| 2017/0025842 | A1 | 1/2017 | Peterson |
| 2017/0054496 | A1 | 2/2017 | Hazani |
| 2017/0070975 | A1 | 3/2017 | Ranson et al. |
| 2017/0133842 | A1* | 5/2017 | Freeman ................ H02J 7/0068 |
| 2017/0324321 | A1* | 11/2017 | Høyerby ............. H02M 7/4837 |
| 2018/0048140 | A1 | 2/2018 | Takuma et al. |
| 2018/0275623 | A1* | 9/2018 | Pellini .................. G05B 19/042 |
| 2018/0351633 | A1 | 12/2018 | Birkmeir et al. |
| 2019/0097457 | A1* | 3/2019 | Hazani ................. H02H 1/0007 |
| 2020/0321865 | A1* | 10/2020 | Bogue ................... H02M 3/158 |
| 2020/0321948 | A1* | 10/2020 | Bose ........................ H02M 3/07 |

FOREIGN PATENT DOCUMENTS

| | | |
|---|---|---|
| WO | 2012/071367 A1 | 5/2012 |
| WO | 2016/176314 A1 | 11/2016 |

\* cited by examiner

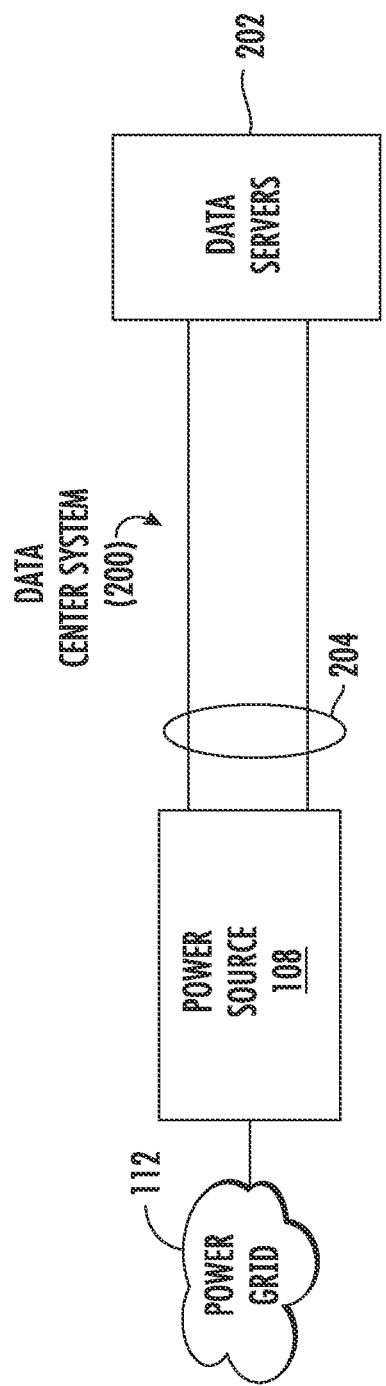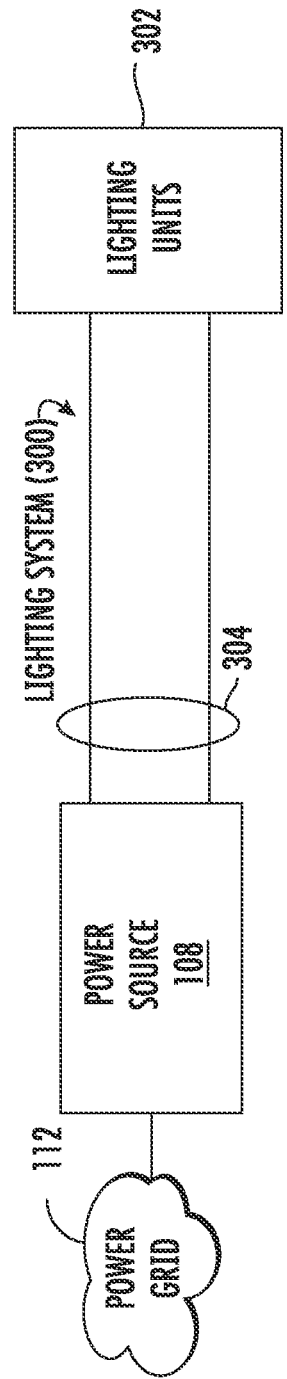

SYSTEMS AND METHODS FOR POWER START UP IN A MULTI-UNIT POWER DISTRIBUTION NETWORK

RELATED APPLICATIONS

The present application claims priority to U.S. Provisional Patent Application No. 63/014,408, filed Apr. 23, 2020, and entitled "SYSTEMS AND METHODS FOR POWER START UP IN A MULTI-UNIT POWER DISTRIBUTION NETWORK," the contents of which is incorporated herein by reference in its entirety.

BACKGROUND

The technology of the disclosure relates to a power distribution network and more particularly, to power start-up times in a multi-unit power distribution network.

Nearly every computing device needs power of some sort. In many instances, the power may be provided by a battery or a local power source such as a wall outlet or the like. However, in some instances, it may be inconvenient to supply power through a wall outlet or a battery. For example, the power demands or voltage levels of the item being powered may exceed that which is available through the conventional wall outlets (e.g., the item may need 340 Volts (V) instead of the conventional 110 V supplied by most US power outlets) or may consume sufficient power that battery supplies are impractical. In such instances, there may be a dedicated power distribution network associated with such items.

A few exemplary systems that may have associated power distribution networks include, but are not limited to, server farms, lightning systems, and distributed communication systems (DCS) such as a distributed antenna system (DAS) or radio access network (RAN). Such systems may have a central power source and one or more power conductors that convey power from the power source to one or more remote subunits (e.g., a server, a lighting fixture, a remote antenna unit, or the like). There is a concern that a human may come into contact with the power conductors and be shocked or electrocuted by such contact. Accordingly, some regulations, such as International Electric Code (IEC) 60950-21, may limit the amount of direct current (DC) that is remotely delivered by the power source over the conductors to less than the amount needed to power the remote subunit during peak power consumption periods for safety reasons.

One solution to remote power distribution limitations is to employ multiple conductors and split current from the power source over the multiple conductors, such that the current on any one electrical conductor is below the regulated limit. Another solution includes delivering remote power at a higher voltage so that a lower current can be distributed at the same power level. For example, assume that 300 Watts (W) of power is to be supplied to a remote subunit by the power source through a conductor. If the voltage of the power source is 60 V, the current will be 5 Amperes (A) (i.e., 300 W/60 V). However, if a 400 V power source is used, then the current flowing through the wires will be 0.75 A. While such variations may lower the current, delivering high voltage through electrical conductors may be further regulated to prevent an undesired current from flowing through a human in the event that a human contacts the electrical conductor. Likewise, there may be a need to prevent the line current from exceeding maximum allowed current values.

Various solutions have been proposed to meet the various regulations while still providing the power needed to the remote subunits. One such approach is to disconnect the remote subunit from the power source and measure activity on the power conductors. Activity that falls within certain profiles may be indicative of a human contacting the power conductors and appropriate remedial steps may be taken until the situation can be investigated and/or corrected. While the safety feature of such a system is desirable, there may be issues relating to powering the remote subunits and concurrently detecting unwanted human contact during the initial power-up or start-up period of such power distribution networks.

No admission is made that any reference cited herein constitutes prior art. Applicant expressly reserves the right to challenge the accuracy and pertinency of any cited documents.

SUMMARY

Embodiments disclosed herein include systems and methods for power start up in a multi-unit power distribution network. In particular, exemplary aspects of the present disclosure contemplate selectively disconnecting and reconnecting a remote subunit from a power conductor in a power distribution network at a relatively low frequency while providing short current pulses (at a low duty cycle) with enough energy transfer to power conditioning elements within the remote subunit during a start-up sequence. Once the power conditioning elements are properly charged, the remote subunit may change frequencies of the disconnecting and reconnecting so as to synchronize such disconnections to an expected frequency at the power source. Circuitry at the power source may measure activity on the power conductors regardless of frequency to detect an unwanted load on the power conductors (e.g., a human contacting the power conductors). Use of the relatively high current having a low duty cycle during start up enables rapid charging of power conditioning elements while preventing false alarms regarding fault conditions on the power conductors.

In this regard, in one embodiment, a remote subunit is provided. The remote subunit comprises a power input port configured to be coupled to a power conductor. The remote subunit also comprises a switch coupled to the power input port. The remote subunit also comprises a multi-vibrator configured to produce an initial periodic signal. The remote subunit also comprises a controller circuit configured to produce a second periodic signal and a select signal. The remote subunit also comprises a multiplexer coupled to the switch, the multi-vibrator, and the controller circuit and configured to receive the initial periodic signal and the second periodic signal. The multiplexer is configured to provide the initial periodic signal or the second periodic signal based on the select signal, where the initial periodic signal and the second periodic signal open and close the switch.

In an additional embodiment, a power distribution network is provided. The power distribution network comprises a power source, a power conductor coupled to the power source, and a remote subunit. The remote subunit comprises a power input port coupled to the power conductor. The remote unit also comprises a switch coupled to the power input port. The remote unit also comprises a multi-vibrator configured to produce an initial periodic signal. The remote unit also comprises a controller circuit configured to produce a second periodic signal and a select signal. The remote unit also comprises a multiplexer coupled to the switch, the multi-vibrator, and the controller circuit and configured to receive the initial periodic signal and the second periodic signal. The multiplexer is configured to provide the initial periodic signal or the second periodic signal based on the select signal, where the initial periodic signal and the second periodic signal open and close the switch.

In an additional embodiment, a method is provided. The method comprises, at a first remote subunit, charging a first capacitance circuit from a remote power source. The method also comprises using the first capacitance circuit to power a multi-vibrator. The method also comprises opening and closing a switch based on an initial periodic signal from the multi-vibrator. The method also comprises charging a second capacitance circuit. The method also comprises subsequently receiving a select signal at a multiplexer from a controller circuit. The method also comprises selecting using the multiplexer a second periodic signal from the controller circuit. The method also comprises opening and closing the switch based on the second periodic signal. The method also comprises opening and closing a second switch based on a signal from the controller circuit. The method also comprises charging a third capacitance circuit when the second switch is closed.

In an additional embodiment, a distributed communication system (DCS) is provided. The DCS comprises a central unit. The central unit is configured to distribute received one or more downlink communications signals over one or more downlink communications links to one or more remote subunits. The central unit is also configured to distribute received one or more uplink communications signals from the one or more remote subunits from one or more uplink communications links to one or more source communications outputs. The DCS also comprises a plurality of remote subunits. Each remote subunit among the plurality of remote subunits comprises a power input port configured to be coupled to a power conductor. Each remote subunit also comprises a switch coupled to the power input port. Each remote subunit also comprises a multi-vibrator configured to produce an initial periodic signal. Each remote subunit also comprises a controller circuit configured to produce a second periodic signal and a select signal. Each remote subunit also comprises a multiplexer coupled to the switch, the multi-vibrator, and the controller circuit and configured to receive the initial periodic signal and the second periodic signal. The multiplexer is configured to provide the initial periodic signal or the second periodic signal based on the select signal, where the initial periodic signal and the second periodic signal open and close the switch. The remote subunit is configured to distribute the received one or more downlink communications signals received from the one or more downlink communications links, to one or more client devices. The remote subunit is also configured to distribute the received one or more uplink communications signals from the one or more client devices to the one or more uplink communications links. The DCS also comprises a power distribution system. The power distribution system comprises one or more power distribution circuits. Each of the one or more power distributions circuits comprises a distribution power input configured to receive current distributed by a power source. Each of the one or more power distributions circuits also comprises a distribution power output configured to distribute the received current over a power conductor coupled to an assigned remote unit among the plurality of remote subunits. Each of the one or more power distributions circuits also comprises a distribution switch circuit coupled between the distribution power input and the distribution power output. The distribution switch circuit comprises a distribution switch control input configured to receive a distribution power connection control signal indicating a distribution power connection mode. The distribution switch circuit is configured to be closed to couple the distribution power input to the distribution power output in response to the distribution power connection mode indicating a distribution power connect state. The distribution switch circuit is further configured to be opened to decouple the distribution power input from the distribution power output in response to the distribution power connection mode indicating a distribution power disconnect state. Each of the one or more power distributions circuits also comprises a current measurement circuit coupled to the distribution power output and comprising a current measurement output. The current measurement circuit is configured to measure a current at the distribution power output and generate a current measurement on the current measurement output based on the measured current at the distribution power output. The power distribution system also comprises a controller circuit. The controller circuit comprises one or more current measurement inputs communicatively coupled to the one or more current measurement outputs of the one or more current measurement circuits of the one or more power distribution circuits. The controller circuit is configured to, for a power distribution circuit among the one or more power distribution circuits, generate the distribution power connection control signal indicating the distribution power connection mode to the distribution switch control input of the power distribution circuit indicating the distribution power connect state. The controller circuit is also configured to, for a power distribution circuit among the one or more power distribution circuits, determine if the measured current on a current measurement input among the one or more current measurement inputs of the power distribution circuit exceeds a predefined threshold current level. In response to the measured current of the power distribution circuit exceeding the predefined threshold current level, the controller circuit is configured to communicate the distribution power connection control signal comprising the distribution power connection mode to the distribution switch control input of the power distribution circuit indicating the distribution power disconnect state.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 2 is a schematic diagram of an exemplary power distribution network for a server farm, where the power distribution network may have start-up protocols according to exemplary aspects of the present disclosure;

FIG. 3 is a schematic diagram of an exemplary power distribution network for a lighting system, where the power distribution network may have start-up protocols according to exemplary aspects of the present disclosure;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include systems and methods for power start up in a multi-unit power distribution network. In particular, exemplary aspects of the present disclosure contemplate selectively disconnecting and reconnecting a remote subunit from a power conductor in a power distribution network at a relatively low frequency while providing short current pulses (at a low duty cycle) with enough energy transfer to power conditioning elements within the remote subunit during a start-up sequence. Once the power conditioning elements are properly charged, the remote subunit may change frequencies of the disconnecting and reconnecting so as to synchronize such disconnections to an expected frequency at the power source. Circuitry at the power source may measure activity on the power conductors regardless of frequency to detect an unwanted load on the power conductors (e.g., a human contacting the power conductors). Use of the relatively high current having a low duty cycle during start up enables rapid charging of power conditioning elements while preventing false alarms regarding fault conditions on the power conductors.

A power distribution system rarely exists in isolation. Rather, a power distribution system provides infrastructure to some other system, a few of which are briefly discussed with reference to FIGS. 1-3. A brief discussion of a safety feature for a power distribution network, and the timing thereof is provided with reference to FIGS. 4 and 5. A power distribution network with cascaded remote subunits is provided with reference to FIG. 6. While cascaded topologies are specifically discussed, it should be appreciated that a bus, star, or point to multi-point topology may also exist and benefit from aspects of the present disclosure. A discussion of the start-up sequence and timing for a power distribution network according to exemplary aspects of the present disclosure begins below with reference to FIG. 7A.

Figure 1:
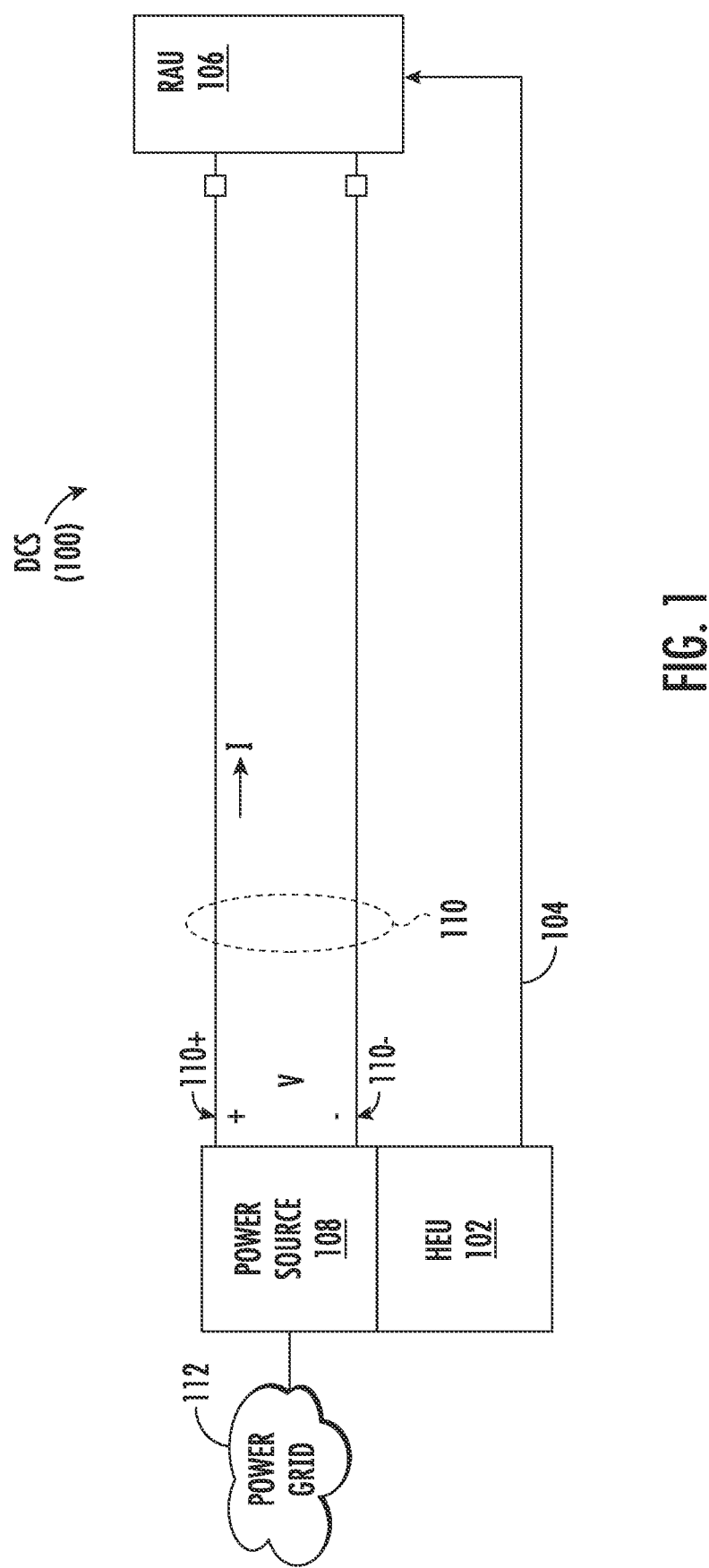
FIG. 1 is a schematic diagram of an exemplary power distribution network for a distributed communication system (DCS), where the power distribution network may have start-up protocols according to exemplary aspects of the present disclosure.

In this regard, FIG. 1 illustrates a simplified block diagram of a distributed communication system (DCS) 100. The DCS 100 may include a head end unit (HEU) 102 that communicates through a communication medium 104 with a remote antenna unit (RAU) 106. The communication medium 104 may be a wire-based or optical fiber medium. The RAU 106 includes a transceiver and an antenna (not illustrated) that communicate wirelessly with mobile terminals and other user equipment (also not illustrated). Because the RAU 106 sends and receives wireless signals and may potentially perform other functions, the RAU 106 consumes power. That power may, in some instances, be provided locally. More commonly, and of interest to the present disclosure, the DCS 100 includes a power distribution network, and the RAU 106 receives power from a power source 108 that transmits power to the RAU 106 over power lines 110 formed from a positive power line 110+ and a negative power line 110−. The power lines 110 may be many meters long, for example, extending through an office building, across multiple floors of a multi-story building, or the like. Further, the power lines 110 may couple to multiple RAUs 106 (even though only one is illustrated in FIG. 1) in a cascaded, bus, star, or point to multi-point topology. The power source 108 may be coupled to an external power grid 112.

Similarly, FIG. 2 illustrates a data center system 200 having a power source 108 coupled to remote data servers 202 through power lines 204. The power source 108 is coupled to the external power grid 112. As with the RAU 106, the data servers 202 may consume power supplied through the power lines 204.

Similarly, FIG. 3 illustrates a lighting system 300 having a power source 108 coupled to remote lighting units 302 through power lines 304. The power source 108 is coupled to the external power grid 112. As with the RAU 106, the remote lighting units 302 may consume power supplied through power lines 304.

It should be appreciated that there may be other contexts that may use a power distribution network, and the examples provided in FIGS. 1-3 are not intended to be limiting. As a note of nomenclature, the RAU 106, the remote data servers 202, and the lighting units 302 are remote subunits.

There may be times when it is appropriate to provide a safety feature in a power distribution network. Such safety feature may be used, for example, to detect if a human has contacted the power conductors of the power distribution network. While there may be a variety of ways to provide such safety feature, one way that has been proposed is to disconnect a load of the remote subunit from the power conductors and measure current flow on the power conductors. If there is a current flow above a threshold while the load is disconnected, it may be inferred that some other, unintended, load (e.g., a human) is in contact with the power conductors. When such current is detected, a power source may then be disconnected from the power conductors to stop current flow through this other, unintended, load.

Figure 4:
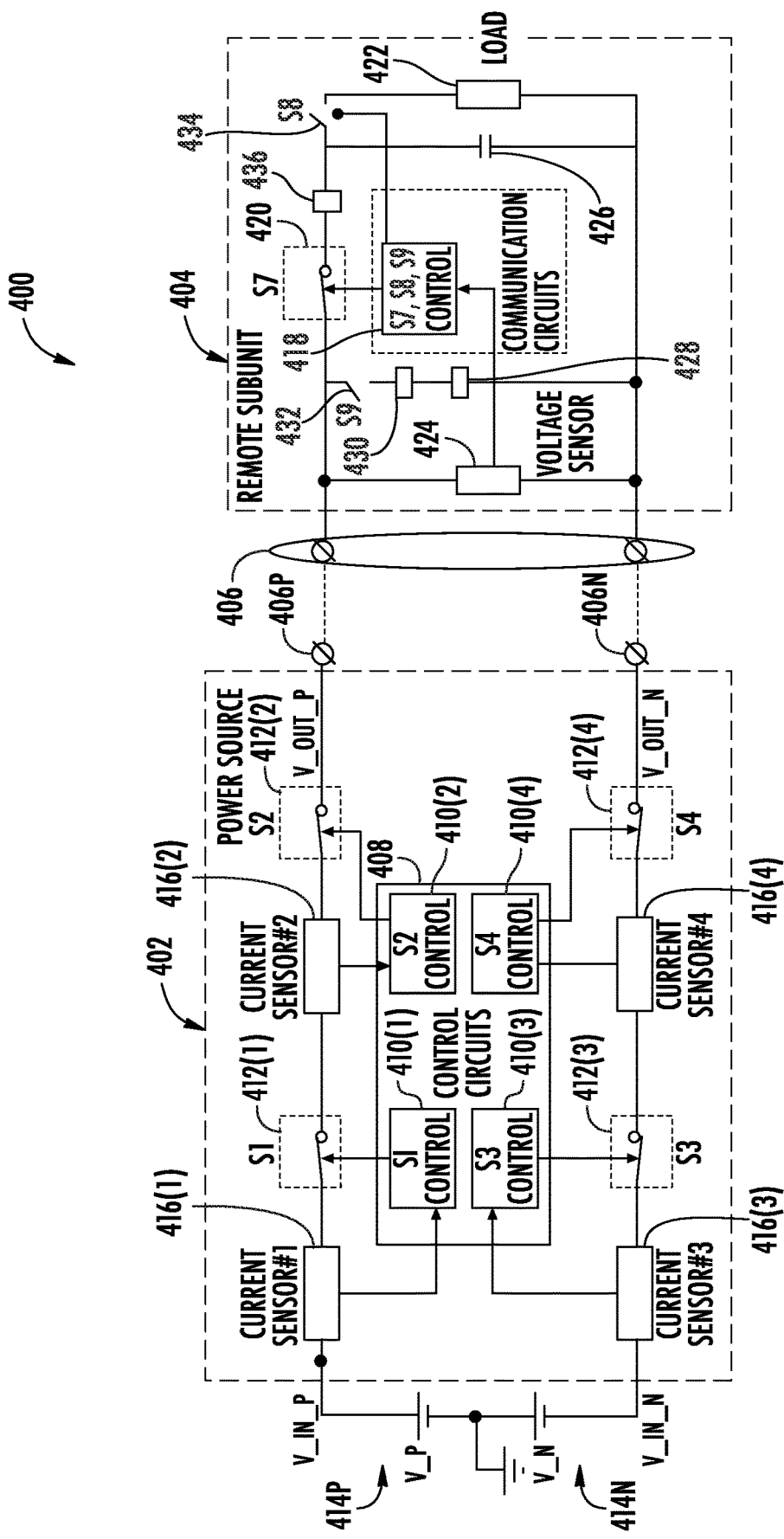
FIG. 4 is a block diagram of a power source and a remote subunit in a power distribution network with disconnect features that may be used to implement safety features.
Figure 5:
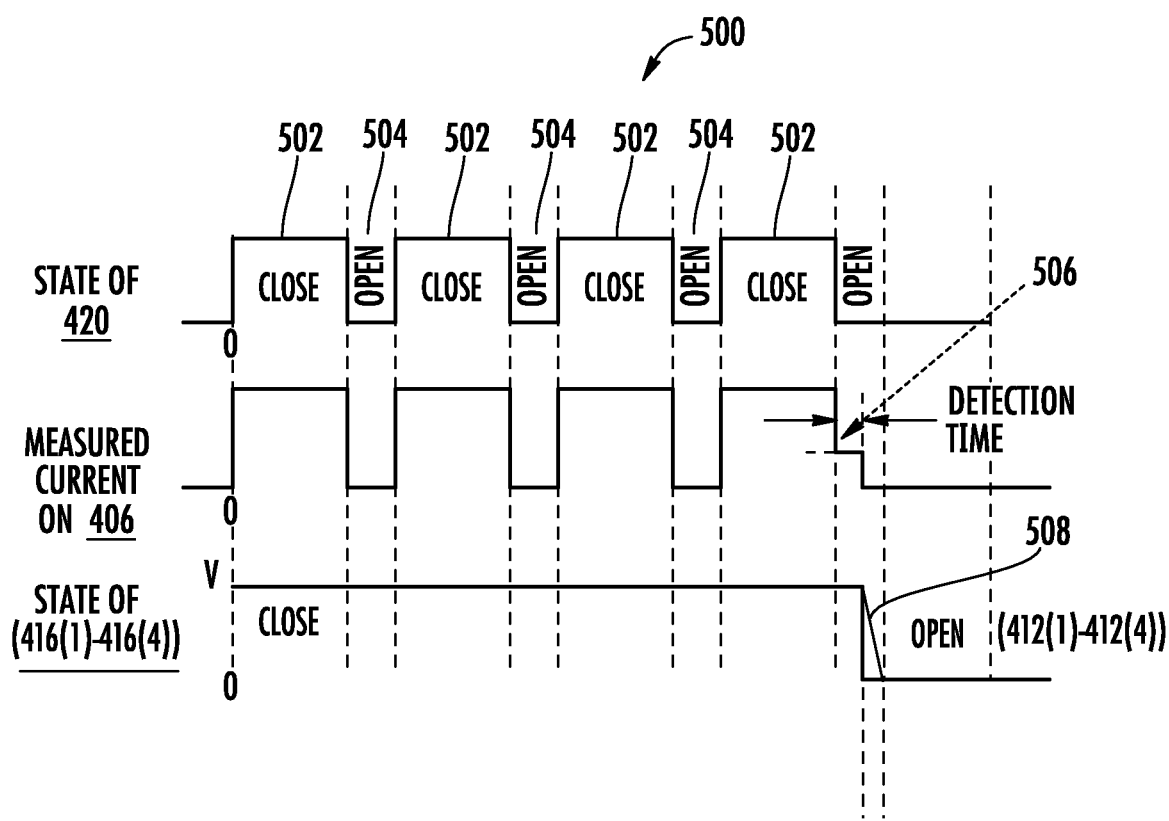
FIG. 5 is a timing diagram showing currents and voltages on power conductors according to the disconnect features of FIG. 4.

In this regard, FIG. 4 provides a block diagram of a power distribution system 400 that provides power from a power source 402 to a remote subunit 404 through power conductors 406. The power conductors 406 may include a positive power conductor 406P and a negative power conductor 406N. The power source 402 may include a control circuit 408 with optional sub circuits 410(1)-410(4) configured to control switches 412(1)-412(4) that connect power supplies 414P and 414N to the power conductors 406P and 406N, respectively. Current sensors 416(1)-416(4) or other current measurement circuits may be provided in the power source 402. The current measurements provided by the current sensors 416(1)-416(4) may be used to detect unsafe operating conditions. Note that for both the positive path and for the negative (return) path, the arrangement of switches and sensors may be changed to accommodate design requirements (e.g., cost, layout, or the like). For example, current sensors 416(1) and 416(2) may be adjacent to one another followed by the two switches 412(1) and 412(2). From a safety perspective, the arrangement matters less than having redundant functions for each path to avoid a single point of failure. Such redundancy may help comply with UL 60950-1 or UL 62368.

With continued reference to FIG. 4, the remote subunit 404 may include a control circuit 418 that controls a switch 420 (also referred as S7). The switch 420 may decouple a load 422 from the power conductors 406. A voltage sensor 424 may be provided that monitors the voltage levels on the power conductors 406 and reports the same to the control circuit 418.

It should be appreciated that the load 422 may still need power when the switch 420 is open. Accordingly, a capacitance circuit (e.g., a capacitor) 426 may be provided that is charged while the switch 420 is closed and then used to provide power to the load 422 when the switch 420 is open. As the load 422 may be relatively high energy, the capacitance circuit 426 may be relatively large. Initially charging the capacitance circuit 426 may provide challenges. In particular, overcurrent or current inrush may cause inadvertent assumptions of a short circuit. Additional circuitry such as a hot swap circuit or current limiter may be provided as explained below.

Further, a DC-DC powering circuit 428 may be serially coupled to a current limiter or hot swap function circuit 430. The DC-DC powering circuit 428 may include a small capacitor to power the control circuit 418 (and any communication circuits (not shown) therewithin or associated therewith). A switch 432 (also referred to as S9) may be controlled by the control circuit 418 to couple the hot swap function circuit 430 selectively to the power conductor 406P. An additional switch 434 may be provided between the load 422 and the capacitance circuit 426. This switch 434 (also referred to as S8) may initially be open and then be closed after the capacitance circuit 426 is charged to a predefined level. The switch 434 may be controlled by the control circuit 418. An additional current limiter or hot swap function circuit 436 may also be provided between the switch 420 and the switch 434 to assist in limiting current peaks and stop an inrush current from activating overcurrent or short circuit detection mechanisms. Note that the current limiter and hot swap function circuits 430, 436 may be implemented with the same power transistor.

The control circuit 418 may also use the voltage sensor 424 to identify signaling and/or data communication from the power source 402 and also modify how the switches 420, 432, and 434 are opened and closed to send back signaling or data to the power source 402.

Before further discussion of FIG. 4, a brief discussion of nomenclature is provided. A signal is a periodic signal if it completes a pattern within a measurable time frame, called a period and repeats that pattern over identical subsequent periods. The completion of a full pattern is called a cycle. A period is defined as the amount of time (expressed in seconds) required to complete one full cycle. Periods may repeat at a particular frequency. In general, frequency is 1/period (sometimes expressed as f=1/T, where f is frequency and T is the period). Additionally, a periodic signal may have a duty cycle. The duty cycle may be varied without changing the period of the periodic signal. While duty cycle generally means the proportion of time for which a device is operated, as used herein, duty cycle defines the percentage of time for which the signal is positive. In the instance where the signal is a square wave, duty cycle defines the percentage of time for which the signal is at a logical high level. As a further note of nomenclature, a switch is considered open when the switch is turned off (i.e., current (other than minor leakage current) is not flowing through the switch). Conversely, a switch is considered closed when the switch is turned on (i.e., current is flowing through the switch).

Returning to FIG. 4, in a steady-state operation, the remote subunit 404 opens and closes the switch 420 to decouple the load 422 periodically, thereby interrupting current supplied to the remote subunit 404 and specifically to the load 422 while leaving the voltage on the power conductors 406 high. A timing diagram 500 is provided in FIG. 5 that illustrates operation of the switch 420 and the corresponding changes in current measured on the power conductors 406. Opening and closing of the switch 420 creates power transfer windows 502 (sometimes referred to as a power transfer period) and power interrupt windows 504 (sometimes referred to as a power interrupt period). Collectively, a single power transfer window 502 and adjacent power interrupt window 504 have a period that is termed herein a "pulse repetition interval" or "PRI." The power source 402 may monitor current on the power conductors 406 with the current sensors 416(1)-416(4) to make sure that the power interrupt windows 504 occur. If current is detected during a power interrupt window 504 (e.g., at 506 in FIG. 5), the control circuit 408 may infer that an unintended external load (such as a human) is touching the power conductor(s) 406 creating an unsafe situation. Accordingly, the control circuit 408 may open one or more of the switches 412(1)-412(4) to lower the voltage on the power conductors 406 as shown at 508 in FIG. 5.

As different remote subunits 404 may have differences in the timing with which the switch 420 is activated by the control circuit 418, the power source 402 may initially not know at what point in time within a PRI the remote subunit 404 is generating the power interrupt period. Accordingly, the power source 402 may, during start up, continuously monitor a "sliding window" corresponding to the period of the PRI (e.g., if the PRI is four milliseconds (4 ms), the sliding window is 4 ms). As long as the power source 402 detects a power interrupt period (e.g., for a 4 ms PRI, then a 300 microsecond (µs) power interrupt window), the power source 402 may infer no leakage during the start-up process.

However, there may be situations in a steady state operating state where the power source 402 is not configured to monitor a sliding window and may only monitor during an expected power interrupt period. In such situations, the power source 402 may synchronize to the timing generated by the remote subunit 404. That is, having detected a first interruption with a sliding window, the power source 402 then begins verifying that the power interrupt period occurs at the same temporal place within the PRI. Such synchronization process may run in the background and may halt only during data transfers. In essence, the synchronization process allows the power source 402 to learn the switching rate of the remote subunit 404 and "know" when to expect a power interrupt window 504 by the remote subunit 404. This synchronization process is more complicated when there are multiple remote subunits 404. Exemplary aspects of the present disclosure provide techniques by which multiple remote subunits may synchronize by the end of a start-up process.

Figure 6:
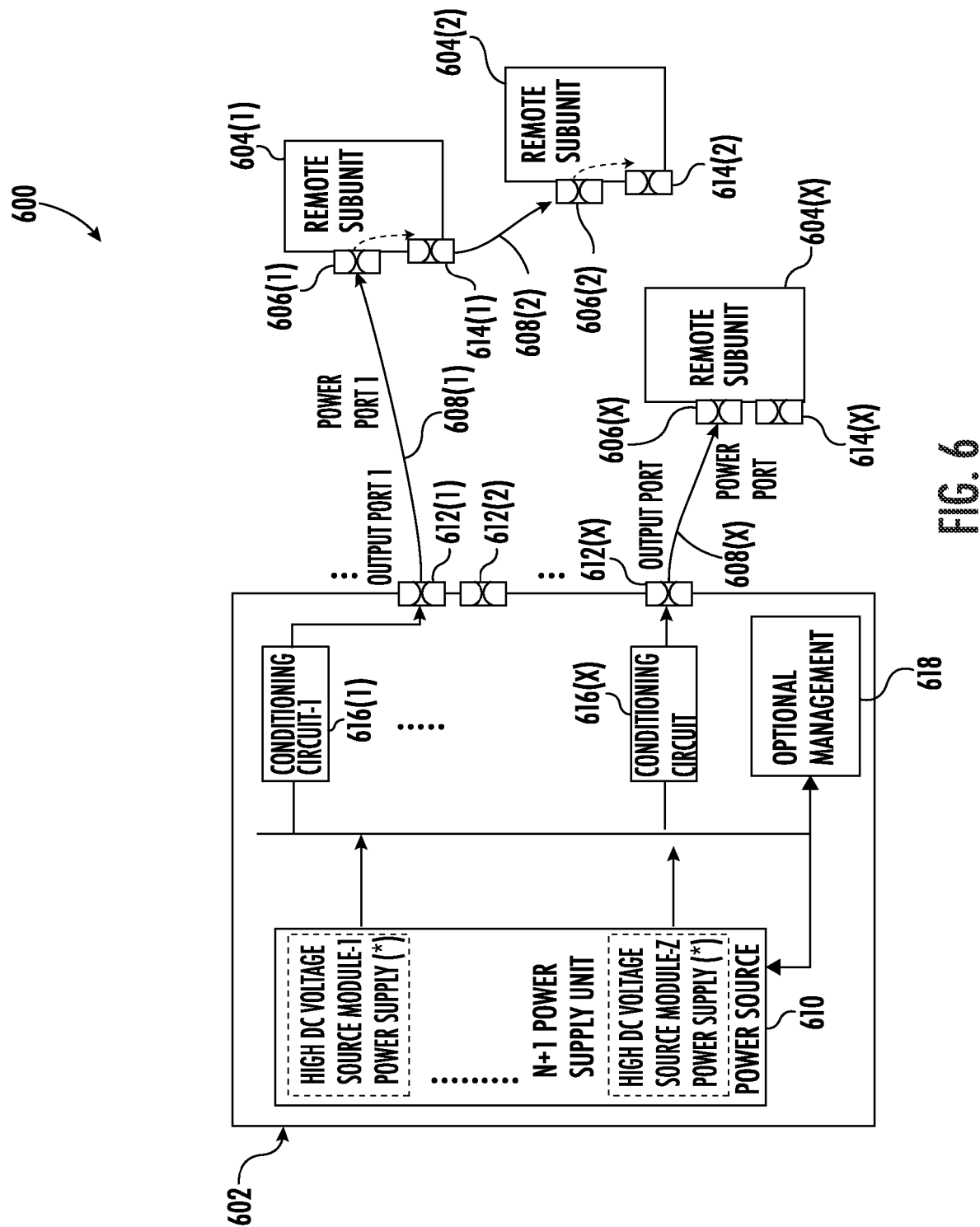
FIG. 6 is a block diagram of a power distribution network having cascaded remote subunits according to an exemplary aspect of the present disclosure.

FIG. 6 is a schematic diagram illustrating a power distribution system 600 with a power distribution circuit 602 configured to distribute power to a plurality of remote subunits 604(1)-604(X). Each remote subunit 604(1)-604(X) includes a remote power input 606(1)-606(X) coupled to power conductors 608(1)-608(X), respectively, which are configured to be coupled to a power source 610. The power distribution circuit 602 includes a plurality of power outputs 612(1)-612(X) coupled to the respective power conductors 608(1)-608(X). Thus, the power distribution from the power distribution circuit 602 to the remote subunits 604(1)-604(X) is in a point-to-multipoint configuration in this example. The power conductors 608(1)608-(X) are also coupled to the remote power inputs 606(1)-606(X). The remote subunits 604(1)-604(X) may also have remote power outputs 614(1)-614(X) that are configured to carry power from the respective power conductors 608(1)-608(X) received on the remote power inputs 606(1)-606(X) to an extended remote subunit, such as extended remote subunit 604(2). Also, as shown in the power distribution system 600 in FIG. 6, the power distribution circuit 602 may include one or more conditioning circuits 616(1)-616(X) and an optional management circuit 618. While not shown, other topologies for the remote subunits 604(1)-604(X) may exist, including, but not limited to a bus, a star, or the like. It should be appreciated that the conditioning circuits 616(1)-616(X) are analogous to the power source 402 of FIG. 4 and perform the same function.

Note that any of the referenced inputs herein can be provided as input pins, ports or circuits, and any of the referenced outputs herein can be provided as output pins, ports or circuits.

As noted above in the discussion of FIG. 4, there may be a capacitance circuit 426 present in the remote subunit 404 (and, while not shown, in the remote subunits 604(1)-604(X)). During start up, there may be insufficient power available to power the controller that opens (turns off) and closes (turns on) the switch 420 (and/or switches 432, 434) at appropriate times. This failure to provide the load disconnection (and concurrent current consumption disconnection) at the appropriate timing may be treated as a fault condition (i.e., a human is contacting the power conductors 406) by the control circuit 408 because the current sensors 416(1)-416(4) may detect current on the power conductors 406 when a power interrupt window 504 is expected. This fault condition may result in a false alarm coupled with safety-driven interrupts by the switches 412(1)-412(4). When there are cascaded remote subunits 604 either as shown in FIG. 6 (e.g., remote subunit 604(2) is cascaded off remote subunit 604(1)) or in some other topology, there may be a need to synchronize the disconnections of the plural remote subunits 404, 604 to avoid such false alarms.

Exemplary aspects of the present disclosure contemplate adding circuitry to the remote subunits 404, 604 that is operable during an initial start-up phase that will assist in providing the appropriate load disconnections in cascaded remote subunits and facilitate synchronization between remote subunits during start up.

Figure 7A:
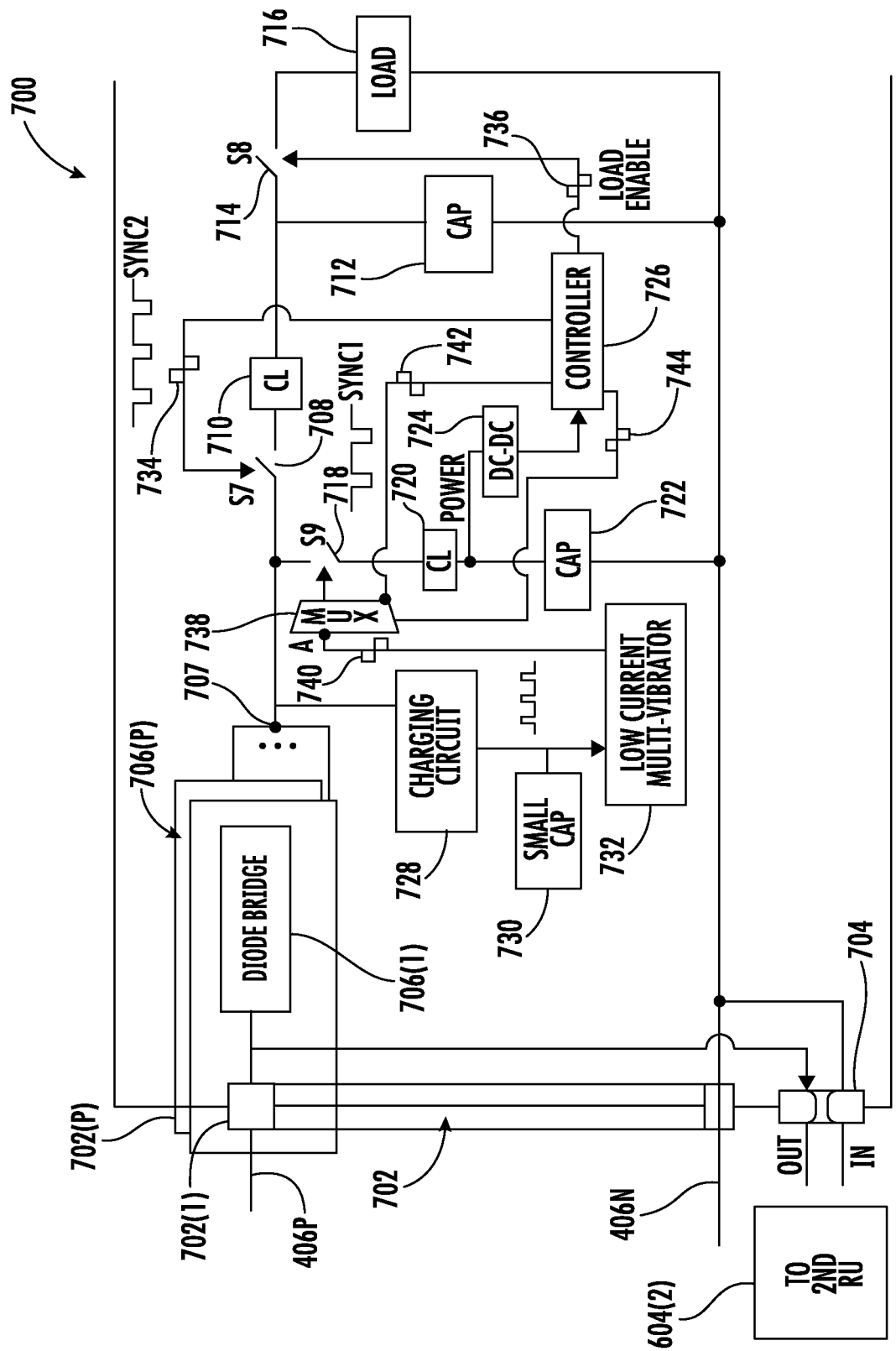
FIG. 7A is a block diagram of a remote subunit with a start-up circuit according to an exemplary aspect of the present disclosure.

In this regard, FIG. 7A illustrates a remote subunit 700 according to an exemplary aspect of the present disclosure. The remote subunit 700 may include one or more power input ports 702(1)-702(P) that are configured to be coupled to a power conductor(s) such as power conductor 406P, 406N. While it may be possible to power a single remote subunit 700 using a single power conductor and thus only need a single power input port (e.g., 702(1)), more commonly current and/or power restrictions on the power conductors 406 necessitate plural power lines being connected to the remote subunit 700, with the power from all the power lines summed to power the remote subunit 700. For example, if the remote subunit 700 needs three hundred watts (300 W) of power, there may be three 100 V-1 A (e.g., 100 W each) to provide the necessary power. The remote subunit 700 may further include a power output port 704 that is configured to be coupled to a power conductor 406 to be connected to a cascaded or extended remote subunit (not shown, but analogous to the remote subunit 604(2) in FIG. 6). The power input ports 702(1)-702(P) may be coupled to respective diode bridges 706(1)-706(P). While diode bridges are illustrated, it should be appreciated that simple diodes may be used instead. The diode bridges 706(1)-706(P) help isolate the power input ports 702(1)-702(P) so that power from one will not leak out to any other one. This arrangement also protects against reverse polarity (although it should be noted that using a diode bridge instead of just a diode does allow the system to function properly even if the polarity of the wires is reversed). Outputs from the diode bridges 706(1)-706(P) are summed at node 707. The node 707 is coupled to a switch 708 (also referred to as S7 and analogous to the switch 420). The switch 708 is coupled to a current limiting (CL) circuit 710, which is designed to limit in-rush current. The CL circuit 710 is coupled to a capacitance circuit 712 (analogous to the capacitance circuit 426 and sometimes referred to as a load capacitance circuit) and to a switch 714 (also referred to as S8 and analogous to switch 434). The switch 714 is coupled to a load 716 (analogous to the load 422).

The node 707 is also coupled to a switch 718 (also referred to as S9 and analogous to switch 432). The switch 718 couples to a CL circuit 720, which in turn couples to a capacitance circuit 722 (sometimes referred to as a controller capacitance circuit). The capacitance circuit 722 may have a smaller capacitance than the capacitance circuit 712. The CL circuit 720 may further be connected to a DC-DC power conditioning circuit 724. The DC-DC power conditioning circuit 724 may be coupled to a controller circuit 726 and provide power thereto.

The node 707 is also coupled to a charging circuit 728. The charging circuit 728 may be connected to a capacitance circuit 730. The capacitance circuit 730 may have a smaller capacitance than the capacitance circuit 722 and thus may sometimes be referred to as a small capacitance circuit. The charging circuit 728 may also be connected a low current multi-vibrator 732. A multi-vibrator device (sometimes just multivibrator in the literature) is an electronic circuit used to implement a variety of simple two-state devices such as relaxation oscillators, timers, and flip-flops. It may consist of two amplifying devices (transistors, vacuum tubes, or other devices) cross-coupled by resistors or capacitors. The timer implementation may generate a square wave as used in the present disclosure. In an exemplary aspect, the multi-vibrator 732 may produce a low duty cycle (i.e., very short pulse width in a relatively long frame) signal, such as a 200-300 µs pulse in a 6 ms frame.

The controller circuit 726 may control the opening and closing (equivalently turning off or turning on) of the switch 708 with a signal 734 (also labeled sync2 in FIG. 7A). The controller circuit 726 may also control the opening (turning off) and closing (turning on) of the switch 714 with a signal 736 (also labeled LOAD ENABLE in FIG. 7A). In contrast, the switch 718 is controlled by a multiplexer (MUX) 738. The MUX 738 receives a first input signal 740 from the low current multi-vibrator 732 and a second signal 742 (also labeled sync1 in FIG. 7A) from the controller circuit 726. The second signal 742 has a duty cycle weighted to keep the switch 718 closed for a longer time than the switch 718 is open when the second signal is provided by the multiplexer 738 to the switch 718. The MUX 738 selects between the first input signal 740 and the second signal 742 based on a control signal 744 from the controller circuit 726.

In an exemplary aspect, the CL circuits 710, 720 may be passive such as by using a resistor or a negative temperature coefficient (NTC) resistor that has a high initial resistance, but whose resistance decreases as the device warms. A passive approach is generally appropriate for small loads and/or small capacitors. Alternatively, the CL circuits 710, 720 may be active current limiting devices such as a "hot-swap" control circuit may be used. Note also, that the CL circuits 710, 720 and their respective switches 714, 718 may both be part of a hot-swap control circuit.

At start up, there are multiple phases of operation. At each phase, different circuit groups start to operate. Such operation is controlled by the associated capacitance circuits 712, 722, and 730. In essence, a capacitance circuit is charged while downstream switches are held open (turned off). When the capacitance circuit is charged and capable of providing power to the associated functional block, the next downstream switch is closed (turned on), allowing the next capacitance circuit to charge. With each closed switch, the appropriate CL circuit 710 or 720 may handle the inrush current.

For a steady-state operation by the load 716, without triggering any overcurrent or short circuit protections, but in compliance with the appropriate safety regulations or standards, a few conditions may exist. First all remote subunit timing is synchronized with the power source 402. That is, each remote subunit 700 should have, for example, the same 4 ms timing during which the respective controller circuits 726 use the signal 736 to initiate the load control. The capacitance circuit 712 should be charged to a voltage sufficient that it can still be charged with additional current while at the same time providing current to the load 716.

Figure 7B:
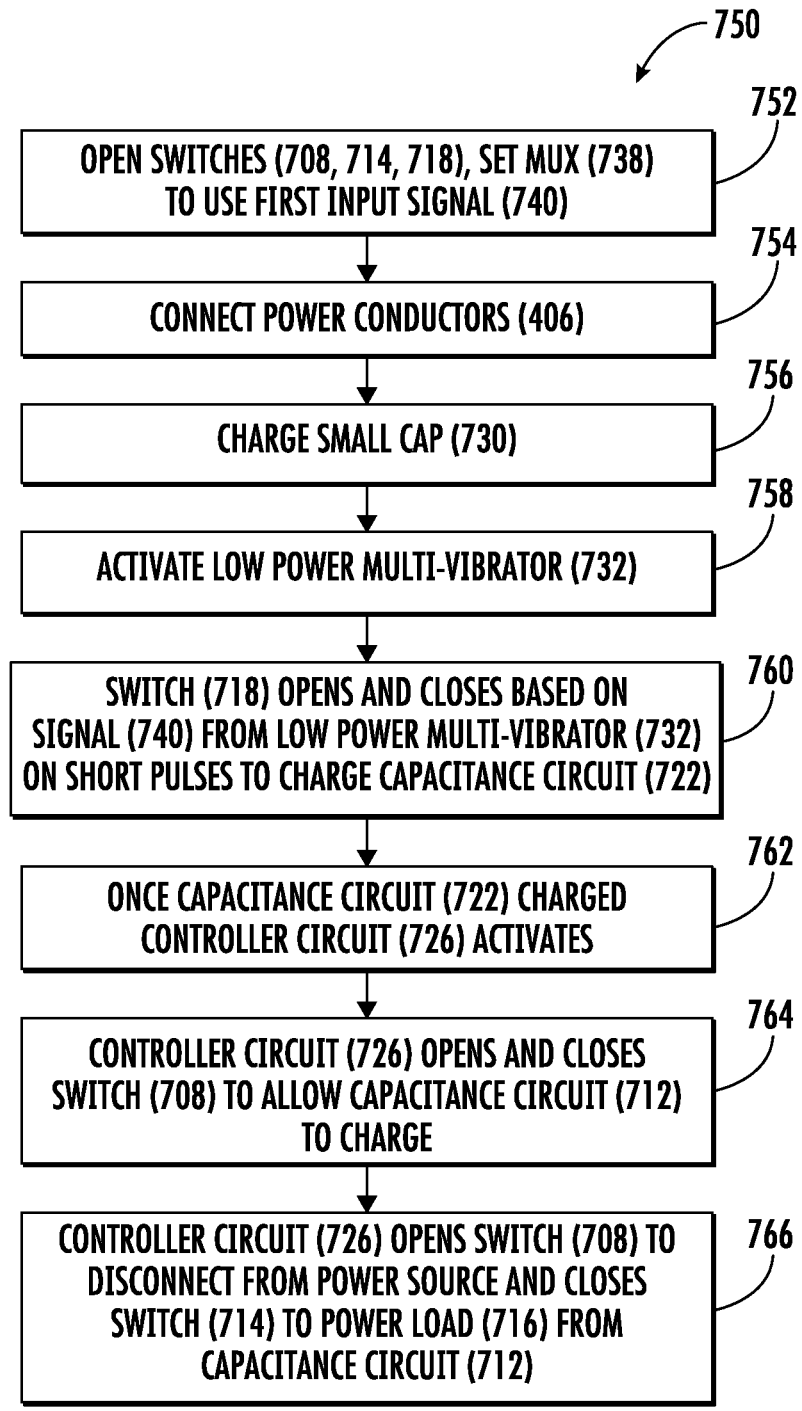
FIG. 7B is a flowchart showing a process for initial start up at the remote subunit of FIG. 7A.
Figure 8:
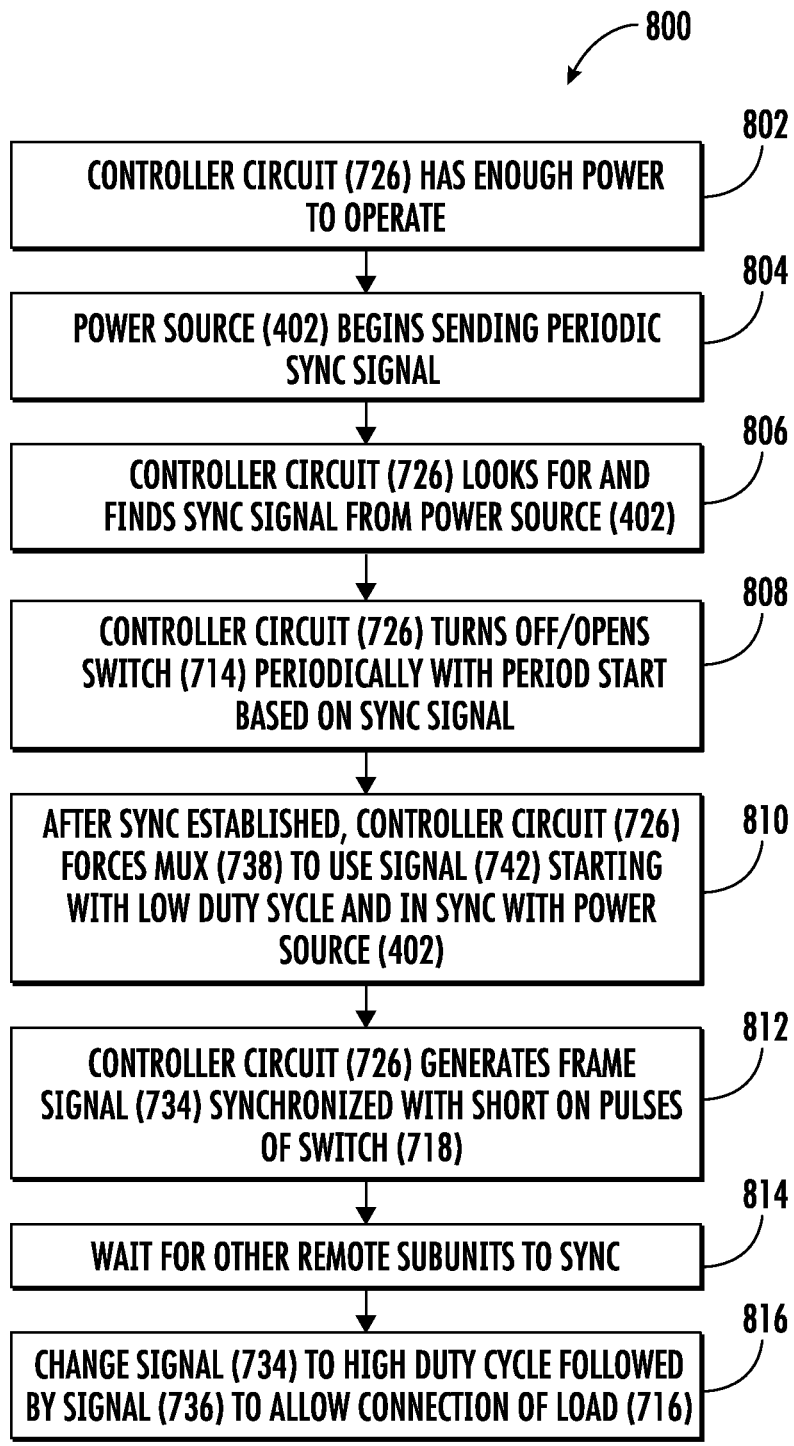
FIG. 8 is a flowchart illustrating an exemplary start up of a remote subunit according to an exemplary process of the present disclosure.

Exemplary aspects of the present disclosure assist in getting to such steady-state operations. FIG. 7B illustrates a flowchart of a process 750 of an initial start up by a single remote subunit 700. Synchronization between multiple remote subunits is discussed below with reference to FIG. 8. Returning to FIG. 7B, the process 750 starts with the switches 708, 714, and 718 open and the MUX 738 programmed to use the first input signal 740 (block 752). Note that the first input signal 740 is initially quiescent because the low current multi-vibrator 732 is not powered and thus is not, initially, active. The power conductors 406 are coupled to the remote subunit 700 (block 754), and the power source 402 begins sending power to the remote subunit 700. With the switches 708 and 718 open, power from the power source 402 initially charges the small capacitance circuit 730 (block 756). Charging the small capacitance circuit 730 may, to avoid a false alarm, occur at a very low, but relatively constant current. For example, the maximum current may be D times lower than the detectable leakage current, where D equals the number of remote subunits 700 coupled to the power source 402. When the small capacitance circuit 730 is sufficiently charged, it will activate the low power multi-vibrator 732 (block 758). The low power multi-vibrator 732 may produce the first input signal 740 with a low duty cycle having, for example, pulses of about 200-300 µs in a 6 ms frame. The switch 718 will now open and close in short pulses based on the first input signal 740 from the low power multi-vibrator 732 to charge the capacitance circuit 722 (block 760). The current drawn by the capacitance circuit 722 should be low enough to not activate any overcurrent or short circuit protections at the power source 402. Once the capacitance circuit 722 is sufficiently charged, the controller circuit 726 is activated (block 762). The controller circuit 726 opens and closes the switch 708 to allow the capacitance circuit 712 to charge (block 764). As with the capacitance circuit 722, the current drawn by the capacitance circuit 712 should be low enough to not activate any overcurrent or short circuit protections at the power source 402. Once the capacitance circuit 712 is sufficiently charged, the controller circuit 726 periodically opens the switch 708 to disconnect the load 716 from the power source 402 while keeping the switch 714 closed so that the load 716 may draw power from the capacitance circuit 712 (block 766). When the controller circuit 726 closes the switch 708 at the end of a power interrupt window, the capacitance circuit 712 recharges while the load 716 is powered by the capacitance circuit 712 and the power source 402.

In the event that there are multiple remote subunits and particularly ones cascaded, the periodic closing of the switch 718 allows the multiple remote subunits to operate in parallel before they synchronize to a cartelized timing from the power source 402. A synchronization process 800 is presented in FIG. 8. The process 800 runs somewhat concurrently with the process 750 in that the process 800 begins when the controller circuit 726 has enough power to operate (block 802). The power source 402 begins or has been sending periodic sync signals (block 804). The periodic sync signals may be on-off keying (OOK), frequency shift keying (FSK), or any other signaling type as, for example, a periodic DC output voltage modulation or drop. In an exemplary aspect, the period of the sync signal may be 4 ms.

The controller circuit 726 looks for and finds the sync signal from the power source 402 (block 806). The controller circuit 726 turns off (opens) the switch 714 periodically with a period start based on the sync signal (block 808). That is, the controller circuit 726 adopts the period of the sync signal from the power source 402 and starts each period based on the sync signal. After synchronization is established, the controller circuit 726 forces the MUX 738 to use the second signal 742 starting with a low duty cycle and in sync with the power source 402 (block 810). Thus, for example, the pulses may still be approximately 200-300 µs, but the frame is now 4 ms, synchronized with the power source 402. The controller circuit 726 generates a frame signal 734 synchronized off the sync signal with short on pulses of the switch 718 (block 812). The controller circuit 726 then waits for other remote subunits 700 to sync (block 814). In an exemplary aspect, this may take several seconds. In another exemplary aspect, this may take approximately two seconds (2 s). The controller circuit 726 then changes the signal 734 to a high duty cycle followed by the signal 736 to allow connection of the load 716 (block 816).

Figure 9:
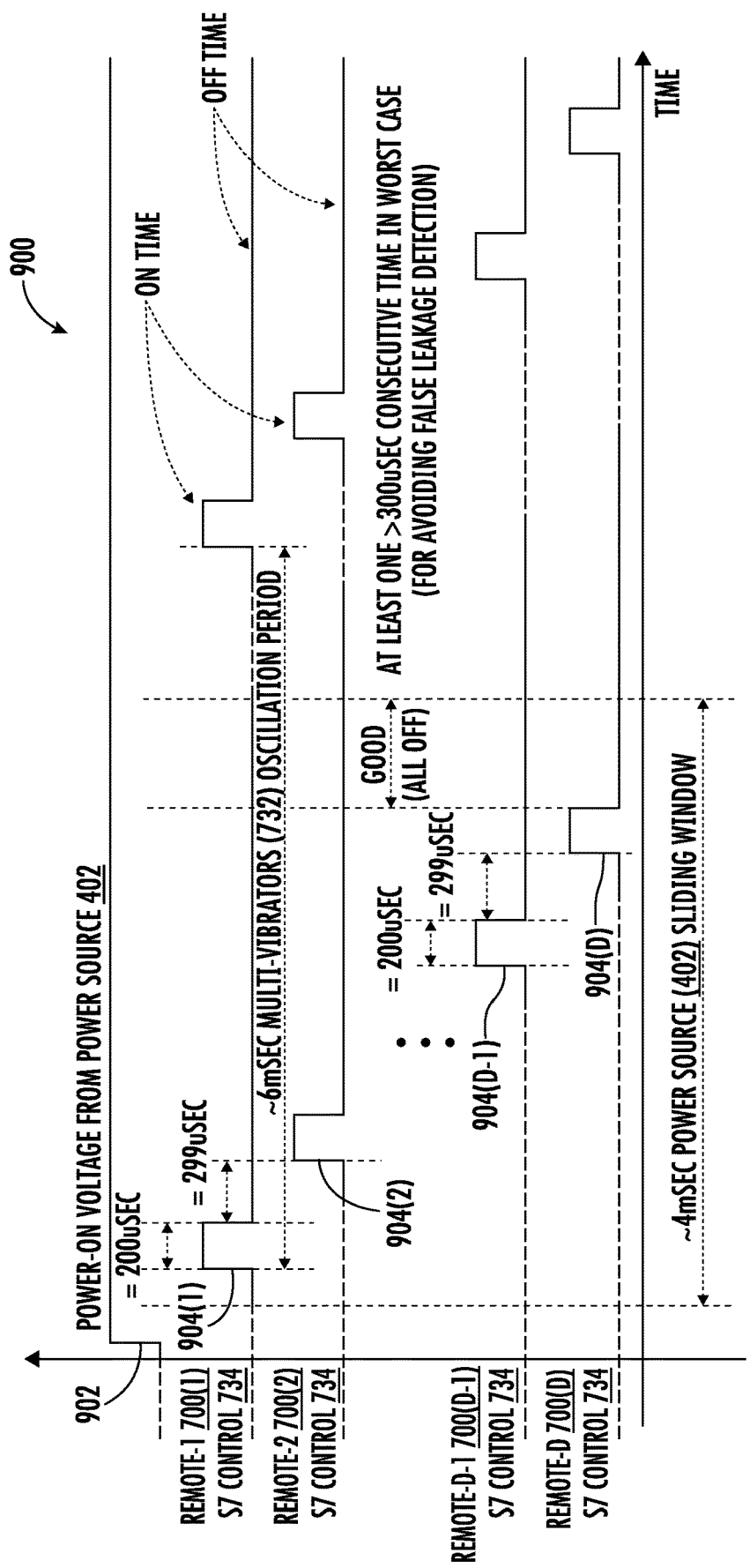
FIG. 9 is a timing diagram showing switch control signals during start up of multiple remote sub-units based on the methods of FIG. 7B and FIG. 8.

A timing diagram 900 analogous to the timing diagram 500 is provided in FIG. 9. The timing diagram 900 shows a power on state 902 at the power source 402. At some time subsequent to the power on state 902, a first remote subunit 700(1) sends a pulse 904(1) on signal 734 to the switch 708. Other remote subunits 700(2)-700(D) also send respective pulses 904(2)-904(D). In an exemplary aspect, the pulses 904(1)-904(D) are each 200 µs with approximately 300 µs between the falling edge of the previous pulse and the rising edge of the next pulse. The period of the pulses 904(1)-904(D) for any given remote subunit 700 is approximately 6 ms, corresponding to the period of the low power multi-vibrator 732. The period, or the spacing between the pulses 904(1)-904(D) may be adjusted to make sure that at least one power interrupt window (e.g., of 300 µs) is detected by the power source 402.

A further example is provided using some basic assumptions. Each remote subunit 700(1)-700(P) consumes a small current every 6 ms for a short time (e.g., 200 µs, based on the first input signal 740 from the low power multi-vibrator 732 through the MUX 738). This allows relatively fast charging of the capacitance circuit 722 to initiate operation of the controller circuit 726. The power source 402 expects to detect, within any given 400 ms "sliding window" frame at least 300 µs of consecutive all "OFF" times, where there is no detected current, or the detected leakage current is below the safety thresholds. In the event that there are ON times of multiple remote subunits 700(1)-700(P) that are overlapping (i.e., more than one subunit 700 is on at the same time), then inside the 4 ms frame, there will still be more overlapping OFF times with low current consumption to satisfy the safety requirement. The worst case situation is that there are no overlapping windows, and thus, the window may be calculated such that the accumulated ON times of P remote subunits should be less than the power source short circuit threshold. Thus, for P remote subunits with no overlapping ON times, with a worst case spacing of 299 µs, the accumulated ON+OFF times (until the next remote 6 ms ON cycle) is P*200 µs+(P−1)*299 µs. Thus the all-OFF no leakage time is 6 ms−[P*200 µs−(N−1)*299 µs]. Assuming P=7, the accumulated time is about 3.2 ms and the all-OFF no leakage time would be about 500 µs, allowing the power source 402 to operate properly. Again, this example is provided for illustration and is not intended to be limiting.

Figure 13:
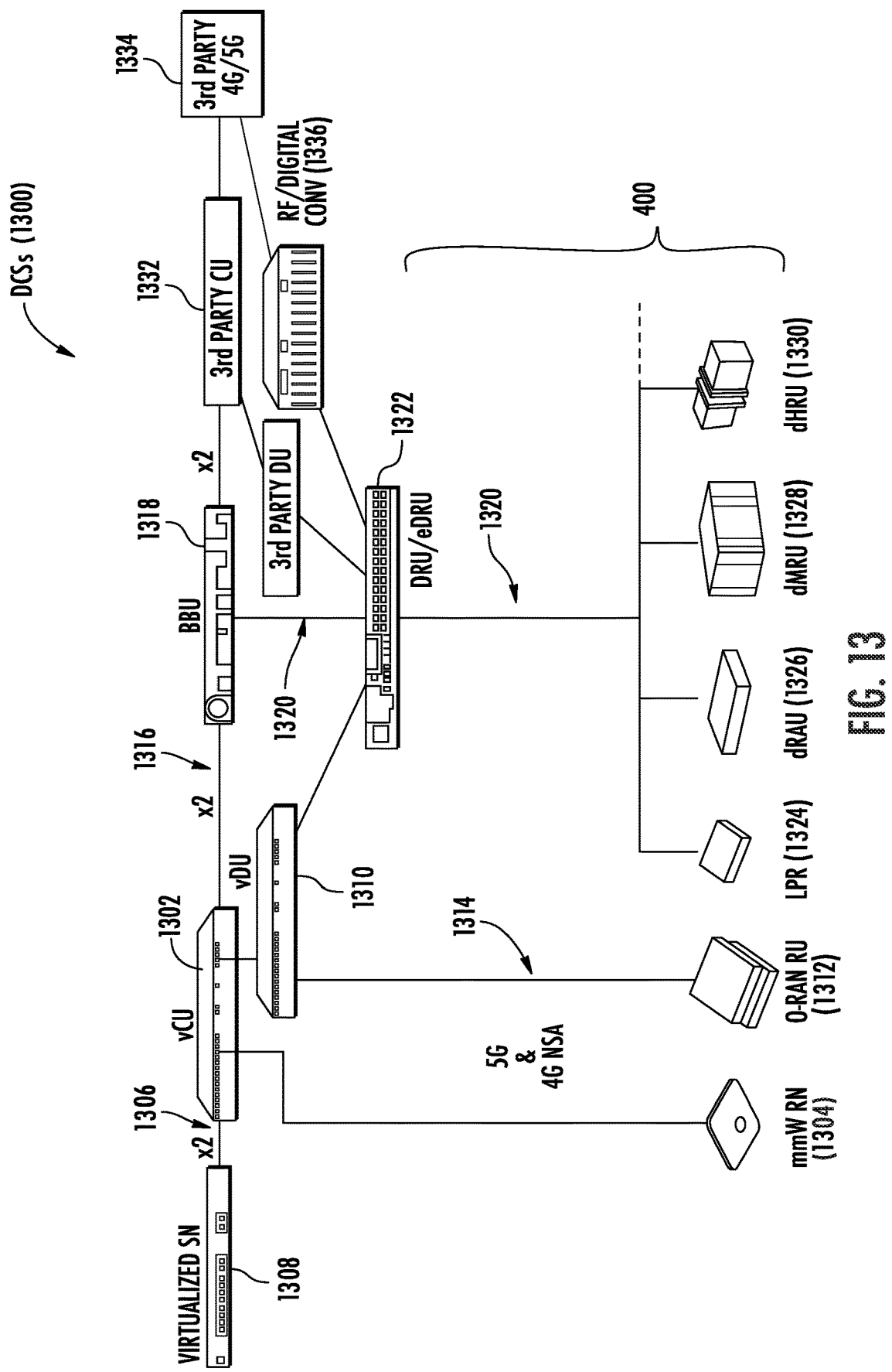
FIG. 13 is a schematic diagram an exemplary DCS that supports 4G and 5G communications services, and that can include one or more power distribution systems, including the power distribution systems in FIGS. 4-8.
Figure 14:
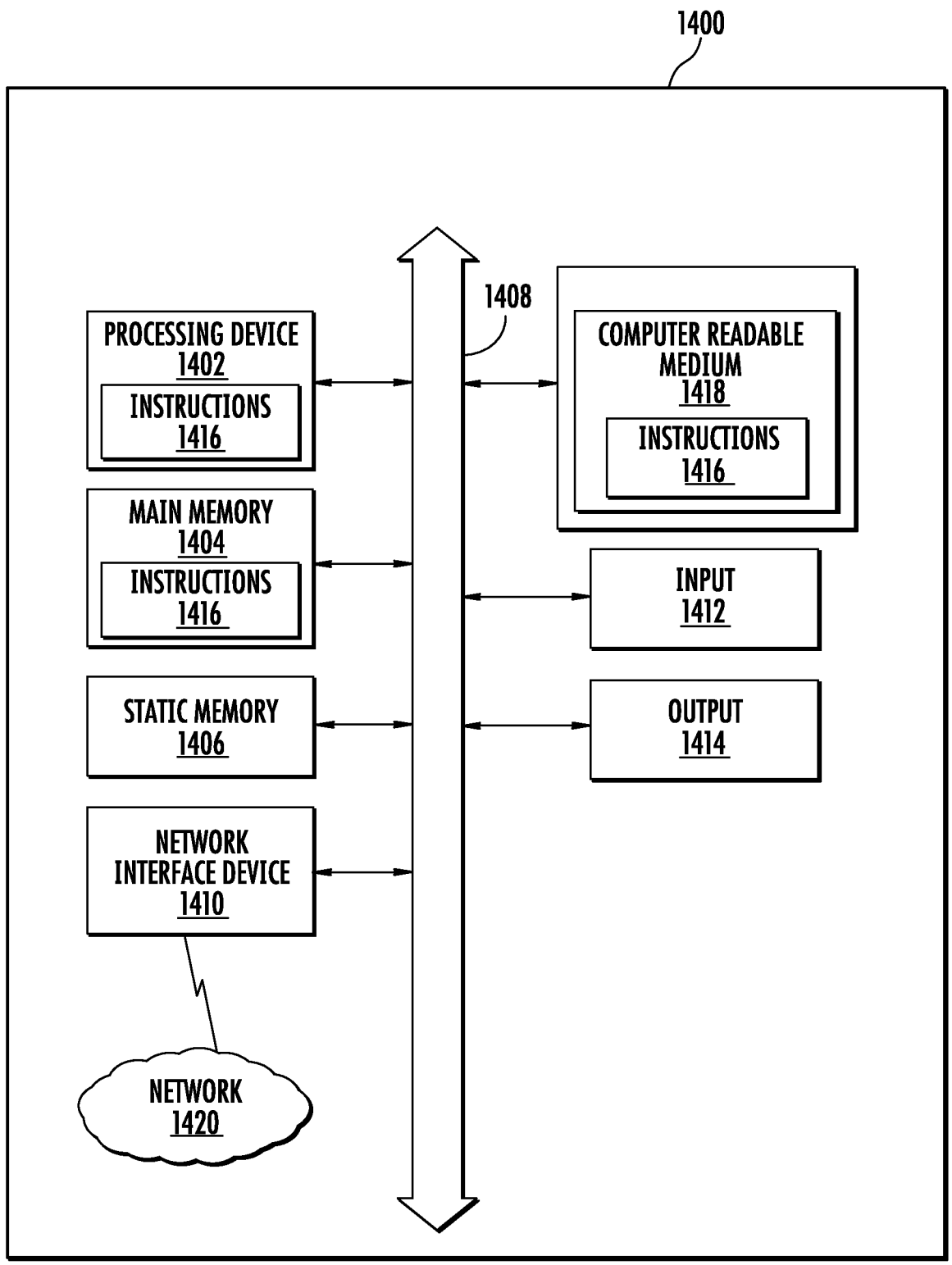
FIG. 14 is a schematic diagram of a generalized representation of an exemplary controller that can be included in any component or circuit in a power distribution system, including the power distribution systems in FIGS. 1-13, wherein an exemplary computer system is adapted to execute instructions from an exemplary computer-readable link.

In the interests of completeness, one exemplary DCS having a power distribution network is explored below with reference to FIGS. 10-13 and an exemplary computer that may be used at various locations within a power distribution network is illustrated in FIG. 14. It should be appreciated that the precise context for the power distribution network is not central to the present disclosure.

Figure 10:
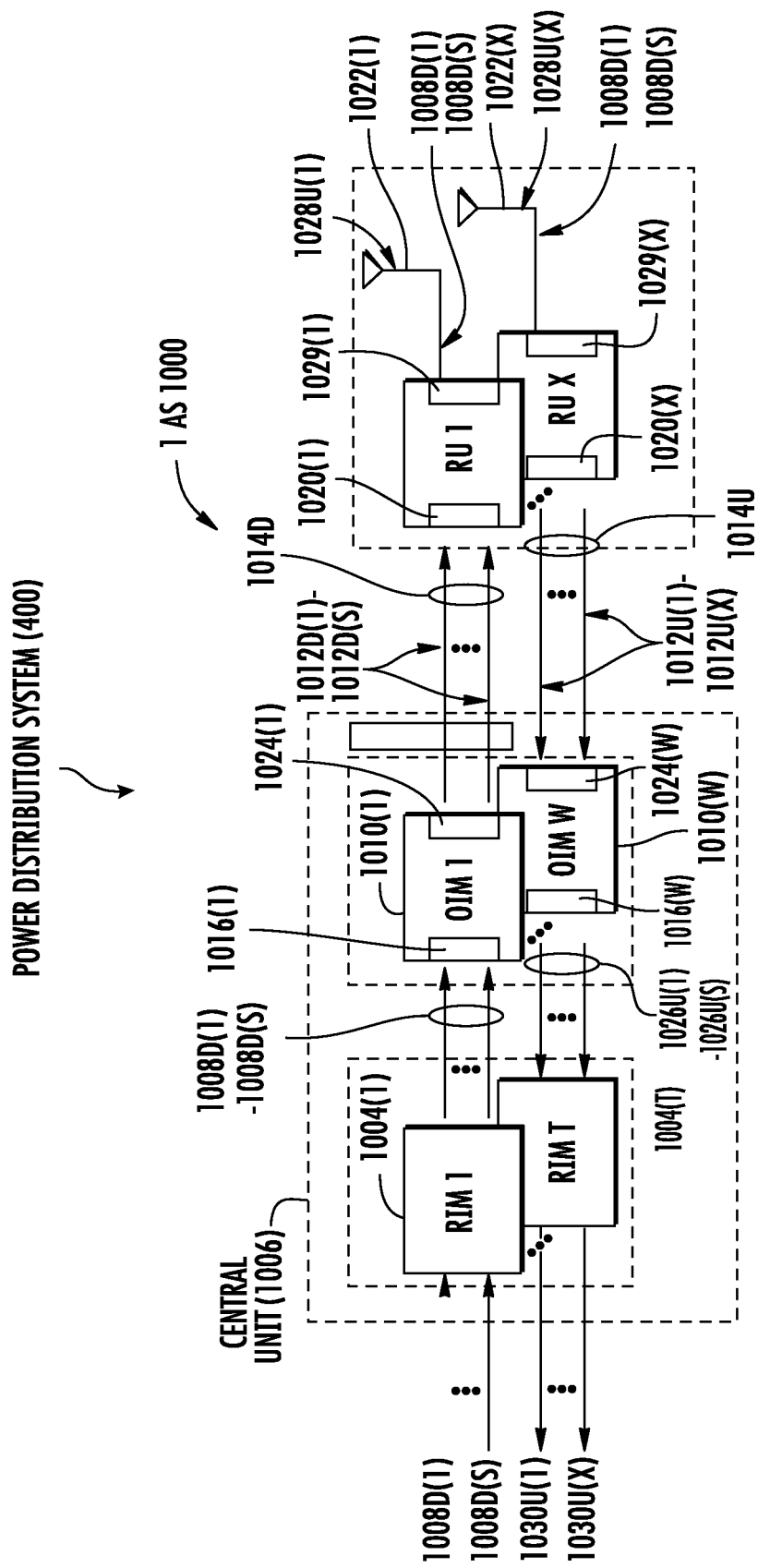
FIG. 10 is a schematic diagram of an exemplary optical fiber-based DCS configured to distribute communications signals between a central unit and a plurality of remote subunits, and that can include one or more power distribution systems, including the power distribution systems in FIGS. 1-8.

FIG. 10 is a schematic diagram of an exemplary optical fiber-based distributed antenna system (DAS) 1000 in which a power distribution system can be provided. In this example, the power distribution system 400 is provided in a DCS which is the DAS 1000 in this example. Note that the power distribution system 400 is not limited to being provided in a DCS. A DAS is a system that is configured to distribute communications signals, including wireless communications signals, from a central unit to a plurality of remote subunits over physical communications media, to then be distributed from the remote subunits wirelessly to client devices in wireless communication range of a remote unit. The DAS 1000 in this example is an optical fiber-based DAS that is comprised of three (3) main components. One or more radio interface circuits provided in the form of radio interface modules (RIMS) 1004(1)-1004(T) are provided in a central unit 1006 to receive and process downlink electrical communications signals 1008D(1)-1008D(S) prior to optical conversion into downlink optical communications signals. The downlink electrical communications signals 1008D(1)-1008D(S) may be received from a base transceiver station (BTS) or baseband unit (BBU) as examples. The downlink electrical communications signals 1008D(1)-1008D(S) may be analog signals or digital signals that can be sampled and processed as digital information. The RIMs 1004(1)-1004(T) provide both downlink and uplink interfaces for signal processing. The notations "1-S" and "1-T" indicate that any number of the referenced component, 1-S and 1-T, respectively, may be provided.

With continuing reference to FIG. 10, the central unit 1006 is configured to accept the plurality of RIMs 1004(1)-1004(T) as modular components that can easily be installed and removed or replaced in a chassis. In one embodiment, the central unit 1006 is configured to support up to twelve (12) RIMS 1004(1)-1004(12). Each RIM 1004(1)-1004(T) can be designed to support a particular type of radio source or range of radio sources (i.e., frequencies) to provide flexibility in configuring the central unit 1006 and the DAS 1000 to support the desired radio sources. For example, one RIM 1004(1)-1004(T) may be configured to support the Personal Communication Services (PCS) radio band. Another RIM 1004(1)-1004(T) may be configured to support the 700 MHz radio band. In this example, by inclusion of these RIMS 1004(1)-1004(T), the central unit 1006 could be configured to support and distribute communications signals, including those for the communications services and communications bands described above as examples.

The RIMs 1004(1)-1004(T) may be provided in the central unit 1006 that support any frequencies desired, including, but not limited to, licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 10, the received downlink electrical communications signals 1008D(1)-1008D(S) are provided to a plurality of optical interfaces provided in the form of optical interface modules (OIMs)1010(1)-1010 (W) in this embodiment to convert the downlink electrical communications signals 1008D(1)-1008D(S) into downlink optical communications signals 1012D(1)-1012D(S). The notation "1-W" indicates that any number of the referenced component 1-W may be provided. The OIMs 1010(1)-1010 (W) may include one or more optical interface components (OICs) that contain electrical-to-optical (E-O) converters 1016(1)-1016(W) to convert the received downlink electrical communications signals 1008D(1)-1008D(S) into the downlink optical communications signals 1012D(1)-1012D (S). The OIMs 1010(1)-1010(W) support the radio bands that can be provided by the RIMs 1004(1)-1004(T), including the examples previously described above. The downlink optical communications signals 1012D(1)-1012D(S) are communicated over a downlink optical fiber communications link 1014D to a plurality of remote subunits (e.g., remote subunits 700) provided in the form of remote subunits in this example. The notation "1-X" indicates that any number of the referenced component 1-X may be provided. One or more of the downlink optical communications signals 1012D(1)-1012D(S) can be distributed to each remote subunit. Thus, the distribution of the downlink optical communications signals 1012D(1)-1012D(S) from the central unit 1006 to the remote subunits is in a point-to-multipoint configuration in this example.

With continuing reference to FIG. 10, the remote subunits include optical-to-electrical (O-E) converters 1020(1)-1020 (X) configured to convert the one or more received downlink optical communications signals 1012D(1)-1012D(S) back into the downlink electrical communications signals 1008D (1)-1008D(S) to be wirelessly radiated through antennas 1022(1)-1022(X) in the remote subunits to user equipment (not shown) in the reception range of the antennas 1022(1)-1022(X). The OIMs 1010(1)-1010(W) may also include O-E converters 1024(1)-1024(W) to convert received uplink optical communications signals 1012U(1)-1012U(X) from the remote subunits into uplink electrical communications signals 1026U(1)-1026U(S) as will be described in more detail below.

With continuing reference to FIG. 10, the remote subunits are also configured to receive uplink electrical communications signals 1028U(1)-1028U(X) received by the respective antennas 1022(1)-1022(X) from client devices in wireless communication range of the remote subunits. The uplink electrical communications signals 1028U(1)-1028U(S) may be analog signals or digital signals that can be sampled and processed as digital information. The remote subunits include E-O converters 1029(1)-1029(X) to convert the received uplink electrical communications signals 1028U (1)-1028U(X) into uplink optical communications signals 1012U(1)-1012U(X). The remote subunits distribute the uplink optical communications signals 1012U(1)-1012U(X) over an uplink optical fiber communications link 1014U to the OIMs 1010(1)-1010(W) in the central unit 1006. The O-E converters 1024(1)-1024(W) convert the received uplink optical communications signals 1012U(1)-1012U(X) into uplink electrical communications signals 1030U(1)-1030U(X), which are processed by the RIMs 1004(1)-1004 (T) and provided as the uplink electrical communications signals 1030U(1)-1030U(X) to a source transceiver such as a BTS or BBU.

Note that the downlink optical fiber communications link 1014D and the uplink optical fiber communications link 1014U coupled between the central unit 1006 and the remote subunits may be a common optical fiber communications link, wherein for example, wave division multiplexing (WDM) may be employed to carry the downlink optical communications signals 1012D(1)-1012D(S) and the uplink optical communications signals 1012U(1)-1012U(X) on the same optical fiber communications link. Alternatively, the downlink optical fiber communications link 1014D and the uplink optical fiber communications link 1014U coupled between the central unit 1006 and the remote subunits may be single, separate optical fiber communications links, wherein for example, wave division multiplexing (WDM) may be employed to carry the downlink optical communications signals 1012D(1)-1012D(S) on one common downlink optical fiber and the uplink optical communications signals 1012U(1)-1012U(X) on a separate, only uplink optical fiber. Alternatively, the downlink optical fiber communications link 1014D and the uplink optical fiber communications link 1014U coupled between the central unit 1006 and the remote subunits may be separate optical fibers dedicated to and providing a separate communications link between the central unit 1006 and each remote subunit.

Figure 11:
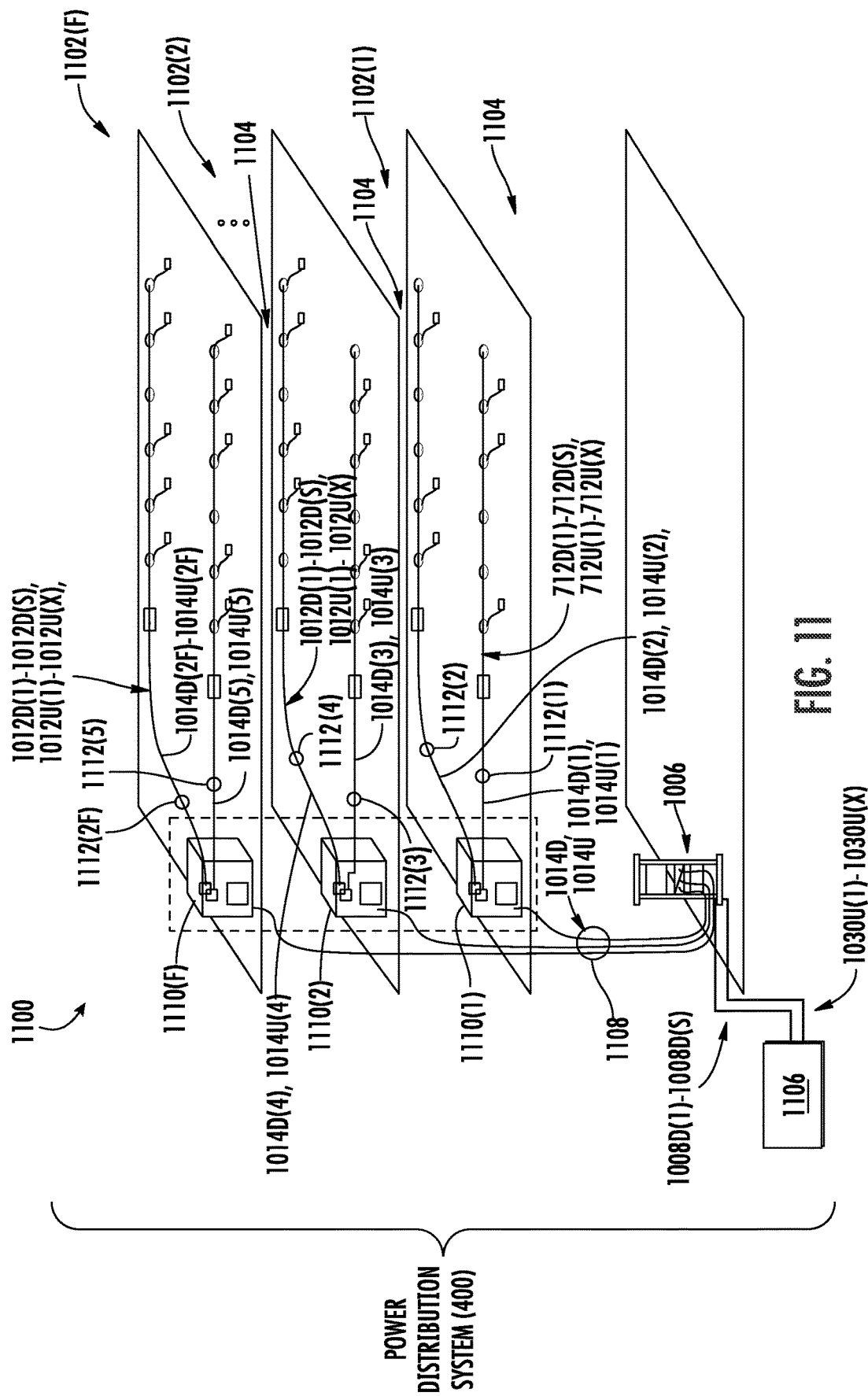
FIG. 11 is a partially schematic cut-away diagram of an exemplary building infrastructure in which the DCS in FIG. 10 can be provided.

The DAS 1000 and its power distribution system 400 can be provided in an indoor environment as illustrated in FIG. 11. FIG. 11 is a partially schematic cut-away diagram of a building infrastructure 1100 employing the power distribution system 400. The building infrastructure 1100 in this embodiment includes a first (ground) floor 1102(1), a second floor 1102(2), and a Fth floor 1102(F), where 'F' can represent any number of floors. The floors 1102(1)-1102(F) are serviced by the central unit 1006 to provide antenna coverage areas 1104 in the building infrastructure 1100. The central unit 1006 is communicatively coupled to a signal source 1106, such as a BTS or BBU, to receive the downlink electrical communications signals 1008D(1)-1008D(S). The central unit 1006 is communicatively coupled to the remote subunits to receive uplink optical communications signals 1012U(1)-1012U(X) from the remote subunits as previously described in FIG. 10. The downlink and uplink optical communications signals 1012D(1)-1012D(S), 1012U(1)-1012U(X) are distributed between the central unit 1006 and the remote subunits over a riser cable 1108 in this example. The riser cable 1108 may be routed through interconnect units (ICUs) 1110(1)-1110(F) dedicated to each floor 1102 (1)-1102(F) for routing the downlink and uplink optical communications signals 1012D(1)-1012D(S), 1012U(1)-1012U(X) to the remote subunits. The ICUs 1110(1)-1110 (F) may also include respective power distribution circuits that include power sources as part of the power distribution system 400, wherein the power distribution circuits are configured to distribute power remotely to the remote subunits to provide power for operating the power-consuming components in the remote subunits. For example, array cables 1112(1)-1112(2F) may be provided and coupled between the ICUs 1110(1)-1110(F) that contain both optical fibers to provide the respective downlink and uplink optical fiber communications media 1014D(1)-1014D(2F), 1014U (1)-1014U(2F) and power conductors (e.g., electrical wire) to carry current from the respective power distribution circuits to the remote subunits.

Figure 12:
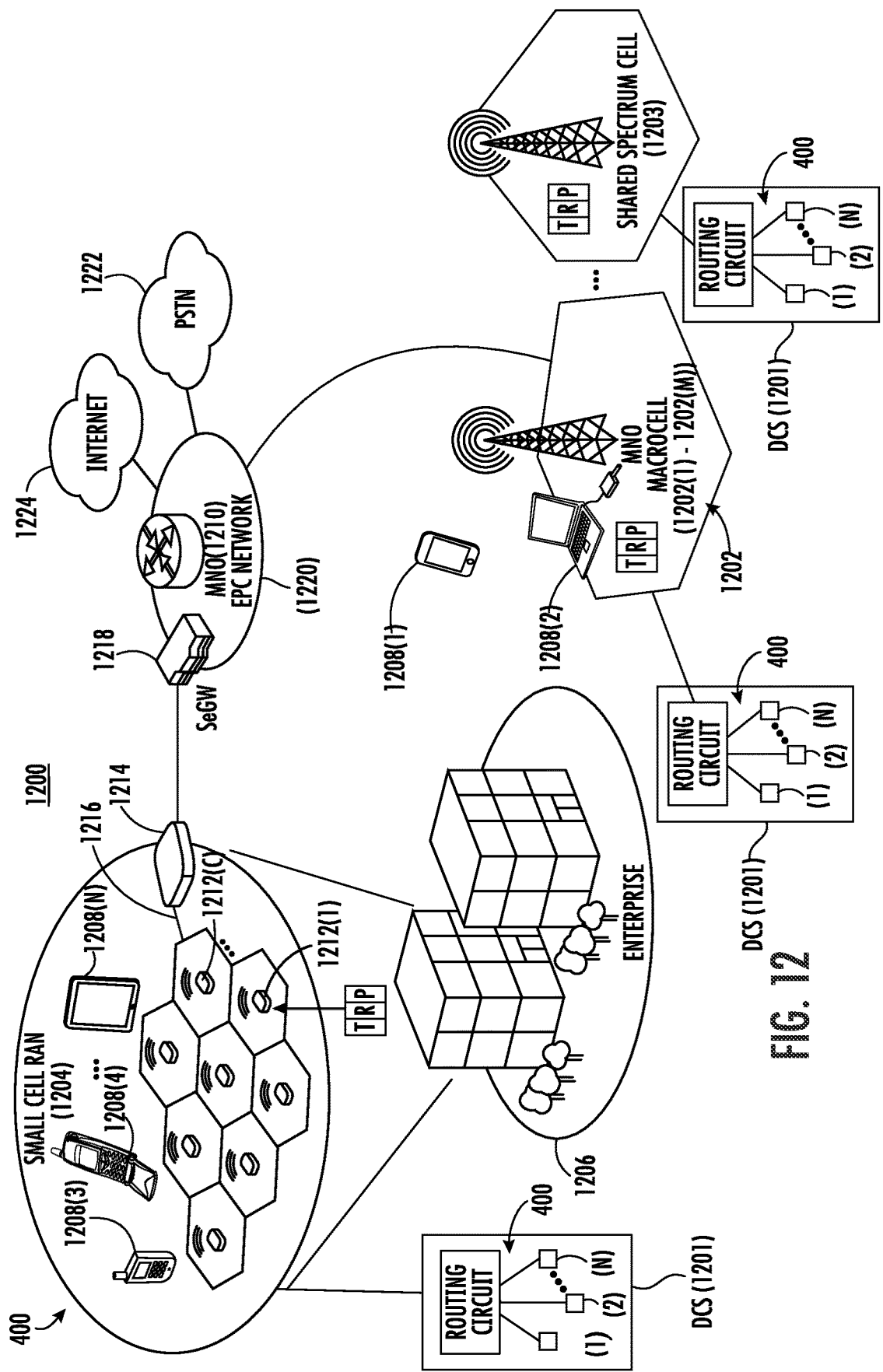
FIG. 12 is a schematic diagram of an exemplary mobile telecommunications environment that includes an exemplary radio access network (RAN) that includes a mobile network operator (MNO) macrocell employing a radio node, a shared spectrum cell employing a radio node, an exemplary small cell RAN employing a multi-operator radio node located within an enterprise environment as DCSs, and that can include one or more power distribution systems, including the power distribution systems in FIGS. 4-8.

FIG. 12 is a schematic diagram of an exemplary mobile telecommunications environment 1200 that includes an exemplary radio access network (RAN) that includes a mobile network operator (MNO) macrocell employing a radio node, a shared spectrum cell employing a radio node, an exemplary small cell RAN employing a multi-operator radio node located within an enterprise environment as DCSs, and that can include one or more power distribution systems, including the power distribution system 400. The environment 1200 includes exemplary macrocell RANs 1202(1)-1202(M) ("macrocells 1202(1)-1202(M)") and an exemplary small cell RAN 1204 located within an enterprise environment 1206 and configured to service mobile communications between a user mobile communications device 1208(1)-1208(N) to an MNO 1210. A serving RAN for a user mobile communications device 1208(1)-1208(N) is a RAN or cell in the RAN in which the user mobile communications devices 1208(1)-1208(N) have an established communications session with the exchange of mobile communications signals for mobile communications. Thus, a serving RAN may also be referred to herein as a serving cell. For example, the user mobile communications devices 1208 (3)-1208(N) in FIG. 12 are being serviced by the small cell RAN 1204, whereas user mobile communications devices 1208(1) and 1208(2) are being serviced by the macrocell 1202. The macrocell 1202 is an MNO macrocell in this example. However, a shared spectrum RAN 1203 (also referred to as "shared spectrum cell 1203") includes a macrocell in this example and supports communications on frequencies that are not solely licensed to a particular MNO and thus may service user mobile communications devices 1208(1)-1208(N) independent of a particular MNO. For example, the shared spectrum cell 1203 may be operated by a third party that is not an MNO and wherein the shared spectrum cell 1203 supports Citizen Broadband Radio Service (CBRS). Also, as shown in FIG. 12, the MNO macrocell 1202, the shared spectrum cell 1203, and/or the small cell RAN 1204 can interface with a shared spectrum DCS 1201 supporting coordination of distribution of shared spectrum from multiple service providers to remote subunits to be distributed to subscriber devices. The MNO macrocell 1202, the shared spectrum cell 1203, and the small cell RAN 1204 may be neighboring radio access systems to each other, meaning that some or all can be in proximity to each other such that a user mobile communications device 1208(1)-1208(N) may be able to be in communications range of two or more of the MNO macrocell 1202, the shared spectrum cell 1203, and the small cell RAN 1204 depending on the location of user mobile communications devices 1208(1)-1208(N).

In FIG. 12, the mobile telecommunications environment 1200 in this example is arranged as an LTE (Long Term Evolution) system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 1200 includes the enterprise environment 1206 in which the small cell RAN 1204 is implemented. The small cell RAN 1204 includes a plurality of small cell radio nodes 1212(1)-1212(C). Each small cell radio node 1212(1)-1212(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 12, the small cell RAN 1204 includes one or more services nodes (represented as a single services node 1214) that manage and control the small cell radio nodes 1212(1)-1212(C). In alternative implementations, the management and control functionality may be incorporated into a radio node, distributed among nodes, or implemented remotely (i.e., using infrastructure external to the small cell RAN 1204). The small cell radio nodes 1212(1)-1212(C) are coupled to the services node 1214 over a direct or local area network (LAN) connection 1216 as an example, typically using secure IPsec tunnels. The small cell radio nodes 1212(1)-1212(C) can include multi-operator radio nodes. The services node 1214 aggregates voice and data traffic from the small cell radio nodes 1212(1)-1212(C) and provides connectivity over an IPsec tunnel to a security gateway (SeGW) 1218 in a network 1220 (e.g., evolved packet core (EPC) network in a 4G network, or 5G Core in a 5G network) of the MNO 1210. The network 1220 is typically configured to communicate with a public switched telephone network (PSTN) 1222 to carry circuit-switched traffic, as well as for communicating with an external packet-switched network such as the Internet 1224.

The environment 1200 also generally includes a node (e.g., eNodeB or gNodeB) base station, or "macrocell" 1202. The radio coverage area of the macrocell 1202 is typically much larger than that of a small cell where the extent of coverage often depends on the base station configuration and surrounding geography. Thus, a given user mobile communications device 1208(1)-1208(N) may achieve connectivity to the network 1220 (e.g., EPC network in a 4G network, or 5G Core in a 5G network) through either a macrocell 1202 or small cell radio node 1212(1)-1212(C) in the small cell RAN 1204 in the environment 1200.

FIG. 13 is a schematic diagram illustrating exemplary DCSs 1300 that support 4G and 5G communications services. The DCSs 1300 in FIG. 13 can include one or more power distribution systems, including the power distribution system 400 in FIG. 4, configured to perform a line capacitance discharge of power conductors between a power source and a remote unit(s) when a safety disconnect of the power source is performed in response to a measured current from the connected power source when the remote unit is decoupled from the power source. The DCSs 1300 support both legacy 4G LTE, 4G/5G non-standalone (NSA), and 5G communications systems. As shown in FIG. 13, a centralized services node 1302 is provided that is configured to interface with a core network to exchange communications data and distribute the communications data as radio signals to remote subunits. In this example, the centralized services node 1302 is configured to support distributed communications services to a millimeter wave (mmW) radio node 1304. The functions of the centralized services node 1302 can be virtualized through an x2 interface 1306 to another services node 1308. The centralized services node 1302 can also include one or more internal radio nodes that are configured to be interfaced with a distribution node 1310 to distribute communications signals for the radio nodes to an open RAN (O-RAN) remote unit 1312 that is configured to be communicatively coupled through an O-RAN interface 1314.

The centralized services node 1302 can also be interfaced through an x2 interface 1316 to a BBU 1318 that can provide a digital signal source to the centralized services node 1302. The BBU 1318 is configured to provide a signal source to the centralized services node 1302 to provide radio source signals 1320 to the O-RAN remote unit 1312 as well as to a distributed router unit (DRU) 1322 as part of a digital DAS. The DRU 1322 is configured to split and distribute the radio source signals 1320 to different types of remote subunits, including a lower-power remote unit (LPR) 1324, a radio antenna unit (dRAU) 1326, a mid-power remote unit (dMRU) 1328, and a high-power remote unit (dHRU) 1330. The BBU 1318 is also configured to interface with a third party central unit 1332 and/or an analog source 1334 through an radio frequency (RF)/digital converter 1336.

FIG. 14 is a schematic diagram representation of additional detail illustrating a computer system 1400 that could be employed in any component or circuit in a power distribution system, including the power distribution system 400 in FIG. 4, configured to perform a line capacitance discharge of power conductors between a power source and a remote unit(s) when a safety disconnect of the power source is performed in response to a measured current from the connected power source when the remote unit is decoupled from the power source. In this regard, the computer system 1400 is adapted to execute instructions from an exemplary computer-readable medium to perform these and/or any of the functions or processing described herein. The computer system 1400 in FIG. 14 may include a set of instructions that may be executed to program and configure programmable digital signal processing circuits in a DCS for supporting scaling of supported communications services. The computer system 1400 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1400 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1400 in this embodiment includes a processing device or processor 1402, a main memory 1404 (e.g., read-only memory (ROM), flash memory, dynamic random access memory (DRAM), such as synchronous DRAM (SDRAM), etc.), and a static memory 1406 (e.g., flash memory, static random access memory (SRAM), etc.), which may communicate with each other via a data bus 1408. Alternatively, the processor 1402 may be connected to the main memory 1404 and/or static memory 1406 directly or via some other connectivity means. The processor 1402 may be a controller, and the main memory 1404 or static memory 1406 may be any type of memory.

The processor 1402 represents one or more general-purpose processing devices, such as a microprocessor, central processing unit, or the like. More particularly, the processor 1402 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1402 is configured to execute processing logic in instructions for performing the operations and steps discussed herein.

The computer system 1400 may further include a network interface device 1410. The computer system 1400 also may or may not include an input 1412, configured to receive input and selections to be communicated to the computer system 1400 when executing instructions. The computer system 1400 also may or may not include an output 1414, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 1400 may or may not include a data storage device that includes instructions 1416 stored in a computer-readable medium 1418. The instructions 1416 may also reside, completely or at least partially, within the main memory 1404 and/or within the processor 1402 during execution thereof by the computer system 1400, the main memory 1404 and the processor 1402 also constituting computer-readable medium. The instructions 1416 may further be transmitted or received over a network 1420 via the network interface device 1410.

While the computer-readable medium 1418 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.), a machine-readable transmission medium (electrical, optical, acoustical or other form of propagated signals (e.g., carrier waves, infrared signals, digital signals, etc.)), etc.

Unless specifically stated otherwise as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flowchart diagrams may be subject to numerous different modifications as will be readily apparent to one of skill in the art. Those of skill in the art would also understand that information may be represented using any of a variety of different technologies and techniques. For example, data, instructions, commands, information, bits, symbols, and chips that may be referenced throughout the above description may be represented by voltages, currents, electromagnetic waves, magnetic fields or particles, optical fields or particles, or any combination thereof.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. For example, the antenna arrangements may include any type of antenna desired, including but not limited to dipole, monopole, and slot antennas. The distributed antenna systems that employ the antenna arrangements disclosed herein could include any type or number of communications mediums, including but not limited to electrical conductors, optical fiber, and air (i.e., wireless transmission). The distributed antenna systems may distribute and the antenna arrangements disclosed herein may be configured to transmit and receive any type of communications signals, including but not limited to RF communications signals and digital data communications signals, examples of which are described in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Multiplexing, such as WDM and/or FDM, may be employed in any of the distributed antenna systems described herein, such as according to the examples provided in U.S. patent application Ser. No. 12/892,424.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A remote subunit comprising:
a power input port configured to be coupled to a power source through a power conductor;
a switch coupled to the power input port;
a small capacitance circuit;
a multi-vibrator distinct from and coupled to the small capacitance circuit configured to produce an initial periodic signal responsive to the small capacitance circuit being charged at remote subunit start up;
a controller circuit configured to produce a second periodic signal and a select signal; and
a multiplexer coupled to the switch, the multi-vibrator, and the controller circuit and configured to receive the initial periodic signal and the second periodic signal, wherein the multiplexer is configured to provide the initial periodic signal or the second periodic signal based on the select signal, where the initial periodic signal and the second periodic signal open and close the switch; and
wherein the power source is configured to monitor a current on the power conductor while a load of the remote subunit is periodically disconnected to detect an unintended load on the power conductor.

2. The remote subunit of claim 1, wherein the power input port comprises a plurality of power input ports and further comprising one or more diodes or diode bridges positioned between the plurality of power input ports and the switch.

3. The remote subunit of claim 1, further comprising the load coupled to the switch.

4. The remote subunit of claim 3, further comprising a first capacitance circuit having a first capacitance, the first capacitance circuit coupled to the switch and the load.

5. The remote subunit of claim 4, further comprising the small capacitance circuit having a second capacitance smaller than the first capacitance, the small capacitance circuit coupled to the multi-vibrator.

6. The remote subunit of claim 5, further comprising a third capacitance circuit coupled to the controller circuit.

7. The remote subunit of claim 1, wherein the initial periodic signal has a duty cycle weighted to keep the switch open for a longer time than the switch is closed when the initial periodic signal is provided by the multiplexer to the switch.

8. The remote subunit of claim 1, wherein the second periodic signal has a duty cycle weighted to keep the switch closed for a longer time than the switch is open when the second periodic signal is provided by the multiplexer to the switch.

9. The remote subunit of claim 1, wherein the multi-vibrator comprises a low-power multi-vibrator configured to operate at voltages below that needed by the load in the remote subunit.

10. The remote subunit of claim 1, wherein the initial periodic signal comprises a low duty cycle periodic signal having a positive value less than forty percent of a corresponding period.

11. The remote subunit of claim 1, wherein the initial periodic signal has a lower frequency and a lower duty cycle than the second periodic signal.

12. The remote subunit of claim 1, further comprising a power output port coupled to the power input port.

13. The remote subunit of claim 1, wherein the remote subunit comprises a remote antenna unit, a remote lighting unit, or a remote server.

14. A power distribution network comprising:
a power source;
a power conductor coupled to the power source; and
a remote subunit, comprising:
a power input port coupled to the power conductor;
a switch coupled to the power input port;
a small capacitance circuit;
a multi-vibrator distinct from and coupled to the small capacitance circuit configured to produce an initial periodic signal responsive to the small capacitance circuit being charged at remote subunit start up;
a controller circuit configured to produce a second periodic signal and a select signal; and
a multiplexer coupled to the switch, the multi-vibrator, and the controller circuit and configured to receive the initial periodic signal and the second periodic signal, wherein the multiplexer is configured to provide the initial periodic signal or the second periodic signal based on the select signal, where the initial periodic signal and the second periodic signal open and close the switch; and
wherein the power source is configured to monitor a current on the power conductor while a load of the remote subunit is periodically disconnected to detect an unintended load on the power conductor.

15. The power distribution network of claim 14, further comprising the load coupled to the switch.

16. The power distribution network of claim 15, further comprising a first capacitance circuit having a first capacitance, the first capacitance circuit coupled to the switch and the load.

17. The power distribution network of claim 16, further comprising the small capacitance circuit having a second capacitance smaller than the first capacitance, the small capacitance circuit coupled to the multi-vibrator.

18. The power distribution network of claim 14, wherein the initial periodic signal has a duty cycle weighted to keep the switch open for a longer time than the switch is closed when the initial periodic signal is provided by the multiplexer to the switch.

19. The power distribution network of claim 14, wherein the second periodic signal has a duty cycle weighted to keep the switch closed for a longer time than the switch is open when the second periodic signal is provided by the multiplexer to the switch.

20. A power distribution network comprising:
a power source;
a power conductor coupled to the power source; and
a remote subunit, comprising:
a power input port coupled to the power conductor;
a switch coupled to the power input port;
a multi-vibrator configured to produce an initial periodic signal responsive to a small capacitance circuit being charged at remote subunit start up;
a controller circuit configured to produce a second periodic signal and a select signal; and
a multiplexer coupled to the switch, the multi-vibrator, and the controller circuit and configured to receive the initial periodic signal and the second periodic signal, wherein the multiplexer is configured to provide the initial periodic signal or the second periodic signal based on the select signal, where the initial periodic signal and the second periodic signal open and close the switch; and wherein the power source is configured to monitor a current on the power conductor while a load of the remote subunit is periodically disconnected to detect an unintended load on the power conductor.

\* \* \* \* \*